US012315071B1

(12) United States Patent
Johnson et al.

(10) Patent No.: US 12,315,071 B1
(45) Date of Patent: May 27, 2025

(54) DEVICES AND METHODS FOR GENERATING AND/OR PRESENTING THREE-DIMENSIONAL LANDSCAPES

(71) Applicant: Apple Inc., Cupertino, CA (US)

(72) Inventors: Magnus H. Johnson, San Francisco, CA (US); Soravis Prakkamakul, Mountain View, CA (US); Randal W. Lamore, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 17/933,321

(22) Filed: Sep. 19, 2022

Related U.S. Application Data

(60) Provisional application No. 63/246,487, filed on Sep. 21, 2021.

(51) Int. Cl.
*G06T 7/33* (2017.01)
*G06T 15/08* (2011.01)

(52) U.S. Cl.
CPC ............... *G06T 15/08* (2013.01); *G06T 7/33* (2017.01)

(58) Field of Classification Search
CPC .................. G06T 19/006; G06T 19/20; G06T 2207/20212; G06T 7/35; G06T 7/33; G06T 15/08; G06T 2200/24
See application file for complete search history.

(56) References Cited

U.S. PATENT DOCUMENTS

| | | | |
|---|---|---|---|
| 2017/0263029 A1* | 9/2017 | Yan | H04N 21/4312 |
| 2020/0349758 A1* | 11/2020 | Paulson | G06T 15/04 |
| 2021/0134066 A1* | 5/2021 | Koidahl | G06V 20/20 |

OTHER PUBLICATIONS

Alidoost et al., "2D Image-to-3D Model: Knowledge-Based 3D Building Reconstruction (3DBR) Using Single Aerial Images and Convolutional Neural Networks (CNNs)", Remote Sensing, vol. 11, Sep. 23, 2019, 25 pages.

Eslami et al., "Neural Scene Representation and Rendering", Available online at: https://www.deepmind.com/blog/neural-scene-representation-and-rendering, accessed on May 14, 2023, Jun. 14, 2018, 7 pages.

Kuo et al., "2D-to-3D Conversion for Single-View Image Based on Camera Projection Model and Dark Channel Model", IEEE International Conference on Acoustics, Speech and Signal Processing (ICASSP), 2012, pp. 1433-1436.

Martin-Brualla et al., "NeRF in the Wild: Neural Radiance Fields for Unconstrained Photo Collections", Google Research, accessed on Jan. 6, 2021, 15 pages.

* cited by examiner

*Primary Examiner* — Antonio A Caschera
(74) *Attorney, Agent, or Firm* — Kubota & Basol LLP

(57) ABSTRACT

Devices, methods, and graphical user interfaces are used for generating, updating, and/or presenting three-dimensional landscapes in a computer-generated environment. In some examples, an electronic device presents a three-dimensional environment. In some examples, while presenting the three-dimensional environment, the electronic device receives, via one or more input devices, a request to add one or more first two-dimensional objects to the three-dimensional environment. In some examples, in response to receiving the one or more first inputs, the electronic updates an appearance of the three-dimensional environment based on the one or more first two-dimensional objects added to the three-dimensional environment.

20 Claims, 20 Drawing Sheets

Image Segmentation

Example Landscape Image

Example Segmented Landscape Image

Panorama Autocompletion

DEVICES AND METHODS FOR GENERATING AND/OR PRESENTING THREE-DIMENSIONAL LANDSCAPES

CROSS-REFERENCE TO RELATED APPLICATIONS

This application claims the benefit of U.S. Provisional Application No. 63/246,487, filed Sep. 21, 2021, the content of which is incorporated herein by reference in its entirety for all purposes.

FIELD OF THE DISCLOSURE

This relates generally to computer systems that generate and/or present three-dimensional landscapes and methods and graphical user interfaces for generating and/or presenting three-dimensional landscapes.

BACKGROUND OF THE DISCLOSURE

Computer-generated environments are environments where at least some objects displayed for a user's viewing are generated using a computer. A user may interact with objects displayed in a computer-generated environment using input devices (e.g., a mouse, a touch sensor, etc.). However, constructing three-dimensional landscapes in such environments can be complex and time consuming.

SUMMARY OF THE DISCLOSURE

Some examples described in this disclosure are directed to devices, methods, and graphical user interfaces for generating, updating, and/or presenting three-dimensional landscapes in a computer-generated environment. In some examples, an electronic device presents a three-dimensional environment. In some examples, while presenting the three-dimensional environment, the electronic device receives, via one or more input devices, a request to add one or more first two-dimensional objects to the three-dimensional environment. In some examples, in response to receiving the one or more first inputs, the electronic updates an appearance of the three-dimensional environment based on the one or more first two-dimensional objects added to the three-dimensional environment. In some examples, updating the appearance of the three-dimensional environment based on the one or more two-dimensional objects includes changing a three-dimensional landscape of the three-dimensional environment to include features of the one or more first two-dimensional objects with a first distribution of the features different than a distribution of features of the one or more first two-dimensional objects.

In some examples, the electronic device generates a first two-dimensional semantic representation of an environment that includes features from one or more two-dimensional objects. In some examples, the two-dimensional semantic representation of the environment has a different distribution of features than the one or more two-dimensional objects. In some examples, the electronic device transforms the two-dimensional semantic representation of the environment in accordance with one or more transformations to generate a transformed semantic representation. In some examples, the electronic device generates, using the transformed semantic representation, a two-dimensional semantic map of the environment that includes a second two-dimensional semantic representation of the features, different than the first two-dimensional semantic representation, and a two-dimensional representation of height information corresponding to the second two-dimensional semantic representation.

It is understood that this Summary does not limit the scope of the disclosure in any way. Additional examples of this disclosure are provided in the Drawings and the Detailed Description that follow.

DETAILED DESCRIPTION

Figure 1:
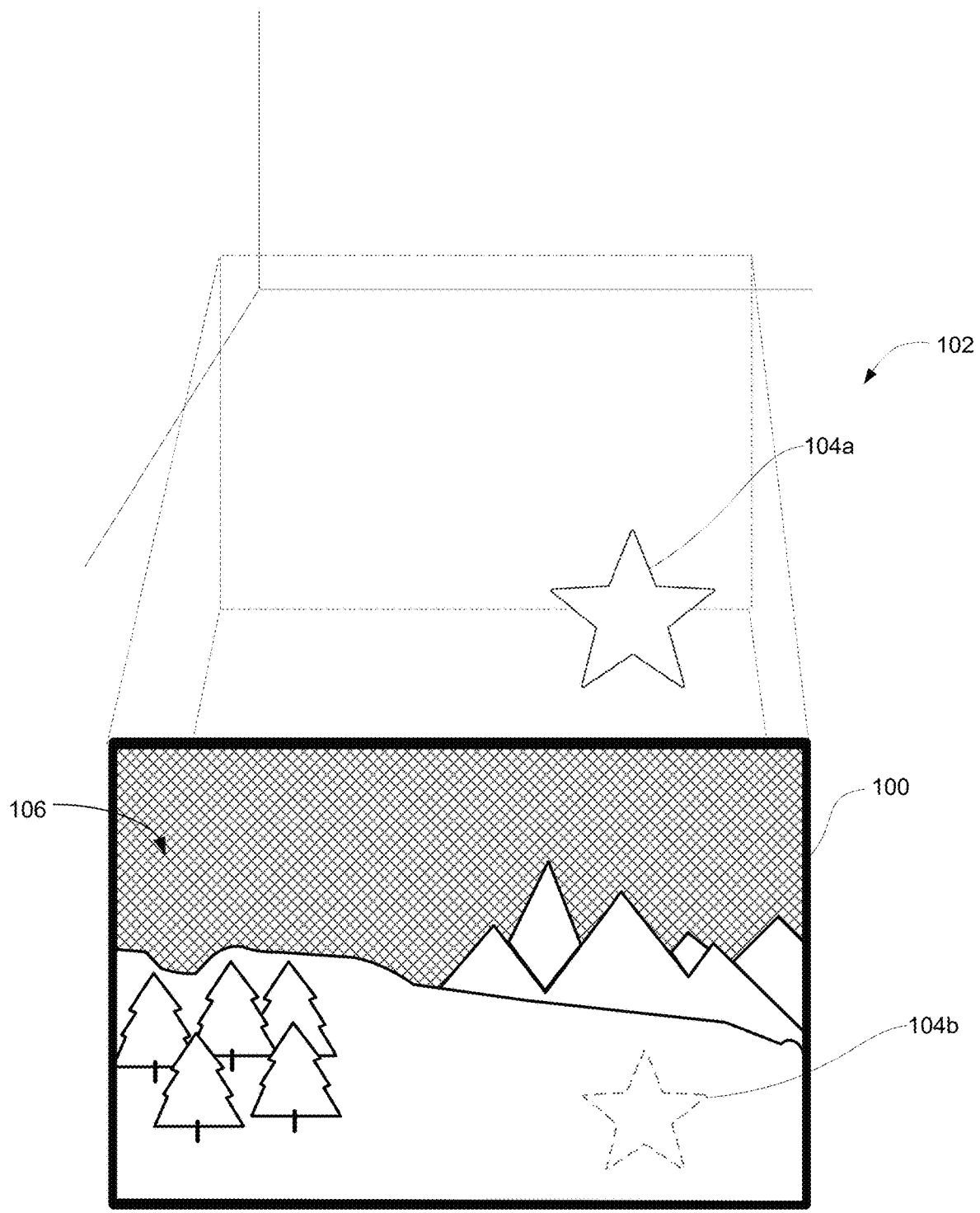
FIG. 1 illustrates an electronic device displaying a computer-generated environment according to some examples of the disclosure.

In the following description, reference is made to the accompanying drawings which form a part hereof, and in which it is shown by way of illustration specific examples that are optionally practiced. It is to be understood that other examples of the disclosure are optionally used and structural changes are optionally made without departing from the scope of the disclosure.

The terminology used in the description of the various described examples herein is for the purpose of describing particular examples only and is not intended to be limiting.

As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Further, although the following description uses terms "first," "second," etc. to describe various elements, these elements should not be limited by the terms. These terms are only used to distinguish one element from another. For example, a first two-dimensional feature (or first two-dimensional element) could be termed a second two-dimensional feature (or second two-dimensional element), and, similarly, a second two-dimensional feature (or first two-dimensional element) could be termed a first two-dimensional feature (or first two-dimensional element), without departing from the scope of the various described examples. The first two-dimensional feature (or first two-dimensional element) and the second two-dimensional feature (or second two-dimensional element) are both two-dimensional features (or two-dimensional elements), but they are not the same two-dimensional feature (or two-dimensional element).

As described herein, the term "if", optionally, means "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. An XR environment is often referred to herein as a computer-generated environment. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 illustrates an electronic device 100 according to some examples of the disclosure. In some examples, the electronic device 100 is a portable electronic device, such as a tablet computer, laptop computer, a smartphone, or another device including a display generation component. Example architectures of electronic device 100 are described below with reference to the block diagrams of FIGS. 2A-2B. As shown in FIG. 1, the electronic device 100 is presenting a three-dimensional environment (e.g., a computer-generated environment) that includes a three-dimensional landscape 106 (e.g., a virtual object). In some examples, the electronic device 100 displays the three-dimensional landscape 106 in response to one or more inputs, as will be described in greater detail with references to FIGS. 3A-3D.

In some examples, the electronic device 100 displays the three-dimensional landscape 106 without displaying, in the three-dimensional environment, portions of a physical environment where the electronic device is physically located (e.g., some or all the content in the three-dimensional environment is virtual content). Conversely, in some examples, the electronic device 100 captures one or more images of the physical environment 102 around the electronic device 100 and displays the representations of the physical environment 102 in the three-dimensional environment. For example, in FIG. 1, the electronic device 100 is displaying, in the three-dimensional environment, a representation 104b together with (e.g., superimposed on) the three-dimensional landscape 106. Thus, the three-dimensional environment optionally recreates portions of physical environment 102 such that the three-dimensional environment appears to the user of the electronic device 100 as if the user is physically located in physical environment 102 (e.g., optionally from the perspective of the user's current location in the physical environment and in direction that the user is currently facing). In some examples, while the electronic device 100 is presenting, in the three-dimensional environment, the three-dimensional landscape 106, one or more other virtual objects (e.g., application user interface, operating system elements, representation of users of other electronic devices, representation of content items, etc.) may also be presented in the three-dimensional environment.

Figure 2A:
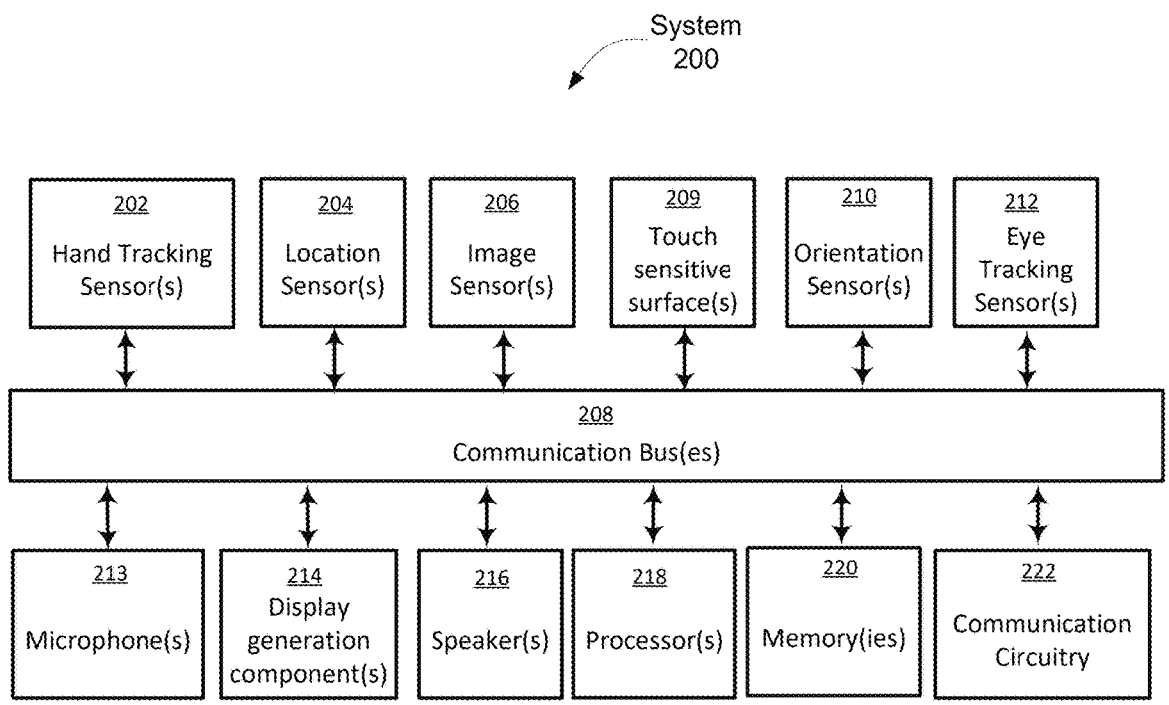
FIGS. 2A-2B illustrate example block diagrams of architectures for a system or device in accordance with some examples of the disclosure.
Figure 2B:
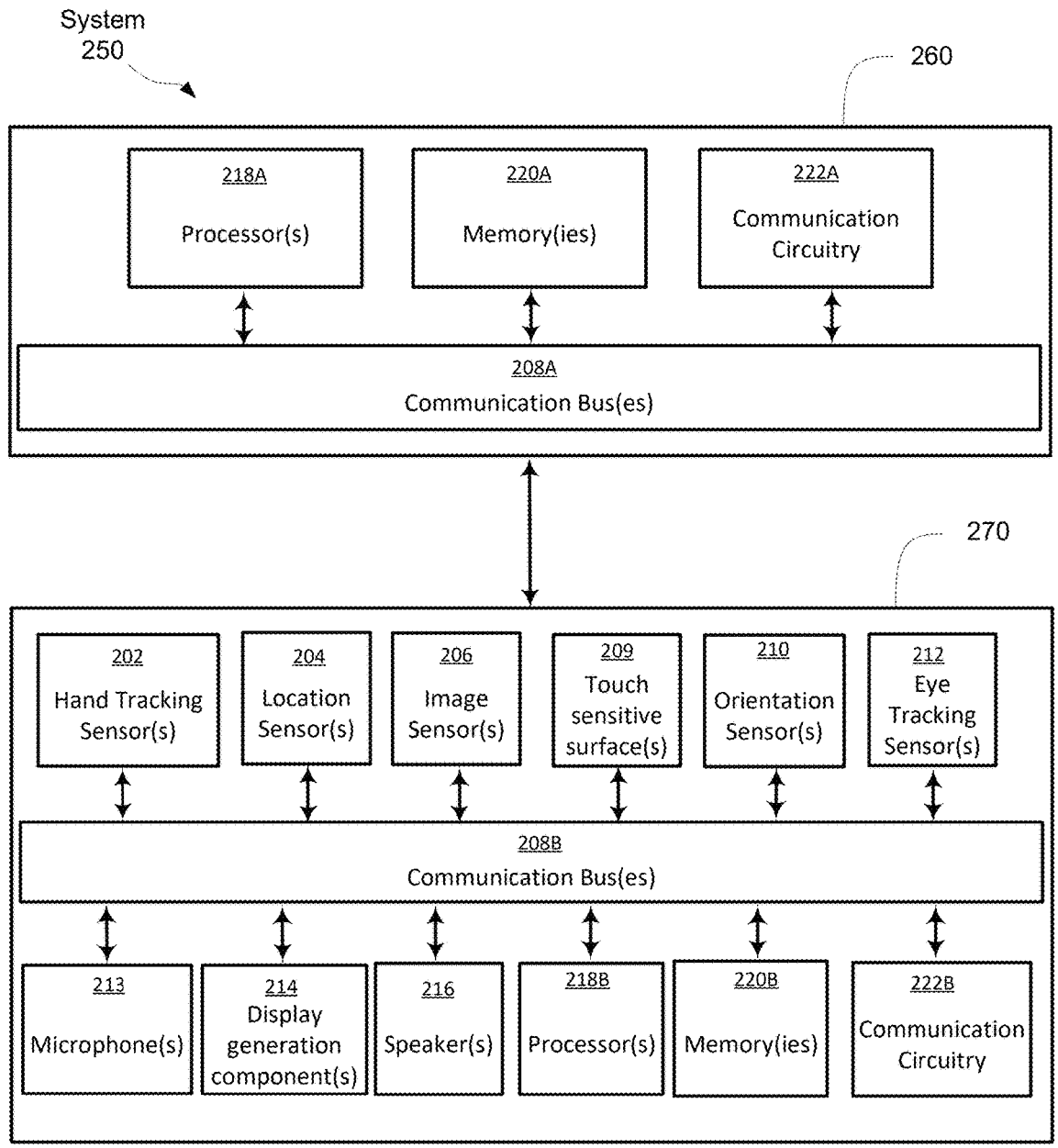

FIGS. 2A-2B illustrate example block diagrams of architectures for a system or device in accordance with some examples of the disclosure. In some examples, device 200 is a portable device, such as a mobile phone, smart phone, a tablet computer, a laptop computer, an auxiliary device in communication with another device, etc. As illustrated in FIG. 2A, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 214 optionally include a single display (e.g., a liquid-crystal display (LCD), organic light-emitting diode (OLED), or other types of display). In some examples, display generation component(s) 214 include multiple displays. In some examples, display generation component(s) 214 includes a display with a touch-sensitive surface (e.g., a touch screen), a projector, a holographic projector, a retinal projector, etc.

In some examples, device 200 includes touch-sensitive surface(s) 209 configured to receive user inputs (touch and/or proximity inputs), such as tap inputs and swipe inputs or other gestures. In some examples, display generation component(s) 214 and touch-sensitive surface(s) 209 together form touch-sensitive display(s) (e.g., a touch screen integrated with device 200 or external to device 200 that is in communication with device 200).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 200. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, device 200 uses CCD sensors, event cameras, and depth sensors in combination to detect the physical environment around device 200. In some examples, image sensor(s) 206 include a first image sensor and a second image sensor. The first image sensor and the second image sensor work together and are optionally configured to capture different information of physical objects in the real-world environment. In some examples, the first image sensor is a visible light image sensor and the second image sensor is a depth sensor. In some examples, device 200 uses image sensor(s) 206 to detect the position and orientation of device 200 and/or display generation component(s) 214 in the real-world environment. For example, device 200 uses image sensor(s) 206 to track the position and orientation of display generation component(s) 214 relative to one or more fixed objects in the real-world environment.

In some examples, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display generation component(s) 214, and/or relative to another coordinate system. Eye tracking sensor(s) 212 are configured to track the position and movement of a user's gaze (eyes, face, and/or head, more generally) with respect to the real-world or computer-generated environment and/or relative to the display generation component(s) 214. In some examples, hand tracking sensor(s) 202 and/or eye tracking sensor(s) 212 are implemented together with the display generation component(s) 214 (e.g., in the same device). In some examples, the hand tracking sensor(s) 202 and/or eye tracking sensor(s) 212 are implemented separate from the display generation component(s) 214 (e.g., in a different device).

In some examples, the hand tracking sensor(s) 202 uses image sensor(s) 206 (e.g., one or more IR cameras, 3D cameras, depth cameras, etc.) that capture three-dimensional information from the real-world including one or more hands. In some examples, the hands can be resolved with sufficient resolution to distinguish fingers and their respective positions. In some examples, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some examples, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some examples, both eyes are tracked separately by respective eye tracking cameras and illumination sources, and a gaze can be determined from tracking both eyes. In some examples, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some examples, microphone(s) 213 includes an array of microphones that optionally operate together (e.g., to identify ambient noise or to locate the source of sound in space of the real-world environment).

Device 200 optionally includes location sensor(s) 204 configured to detect a location of device 200 and/or of display generation component(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display generation component(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2A is an example architecture, but that system/device 200 is not limited to the components and configuration of FIG. 2A. For example, the device/system can include fewer, additional, or other components in the same or different configurations. In some examples, as illustrated in FIG. 2B, system/device 250 can be divided between multiple devices. For example, a first device 260 optionally includes processor(s) 218A, memory or memories 220A, and communication circuitry 222A, optionally communicating over communication bus(es) 208A. A second device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218B, one or more memories 220B, and/or communication circuitry 222B. One or more communication buses 208B are optionally used for communication between the above-mentioned components of device 270. The details of the components for devices 260 and 270 are similar to the corresponding components discussed above with respect to device 200 and are not repeated here for brevity. First device 260 and second device 270 optionally communicate via a wired or wireless connection (e.g., via communication circuitry 222A-222B) between the two devices.

A computer-generated environment may be displayed using an electronic device (e.g., electronic device 100, device 200, device 250), including using one or more display generation components. The computer-generated environment can optionally include various graphics user interfaces ("GUIs") and/or user interface elements/objects. Attention is now directed towards examples of user interfaces ("UI") and associated processes that may be implemented on a computer system, such as a portable multifunction device or a head-mounted device with a display generation component, one or more input devices, and (optionally) one or more cameras. FIGS. 3A-3D illustrate exemplary ways for generating and/or updating a three-dimensional landscape in accordance with some examples of the disclosure.

Figure 3A:
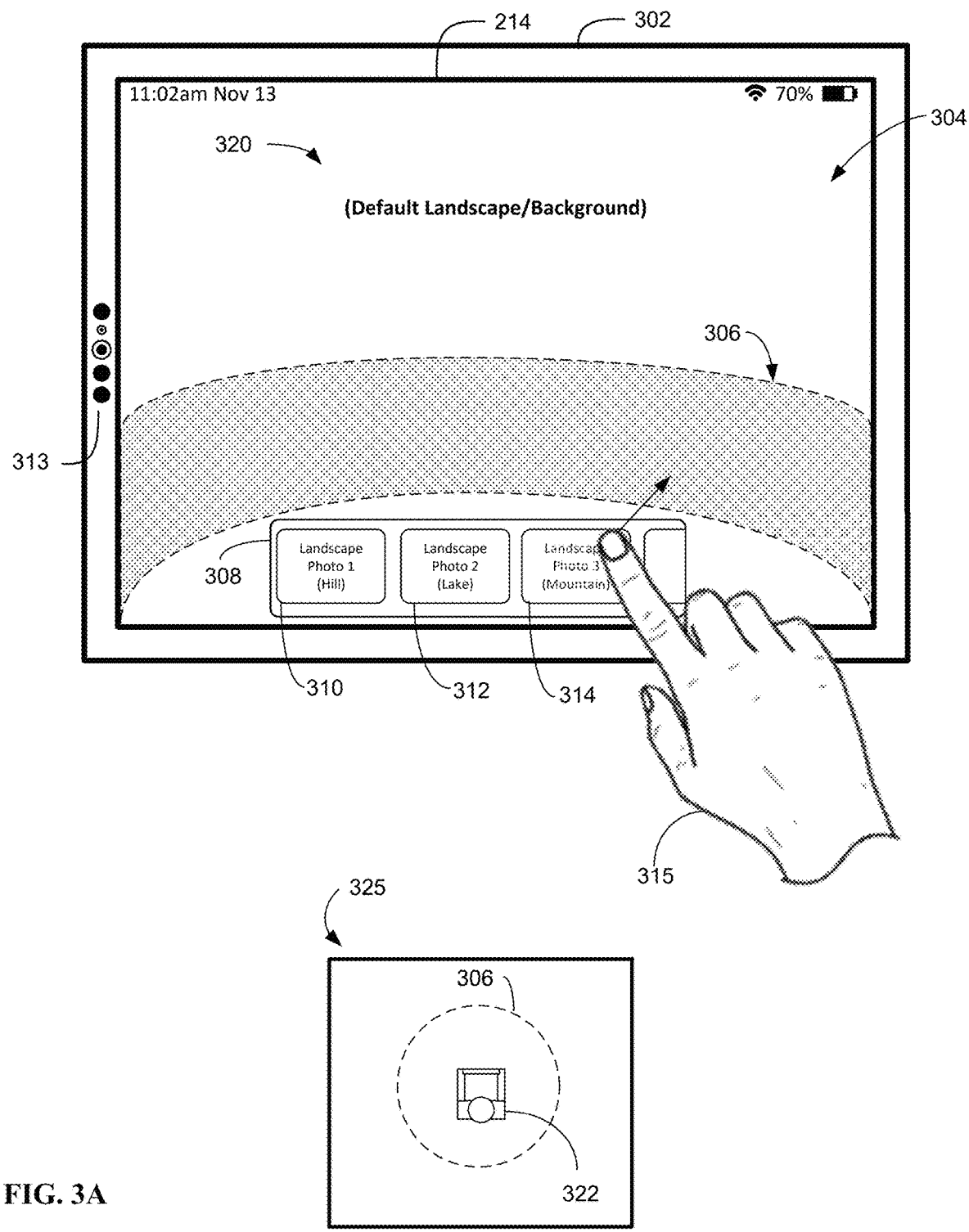
FIGS. 3A-3D illustrate exemplary ways for generating and/or updating a three-dimensional landscape in accordance with some examples of the disclosure.

FIG. 3A illustrates electronic device 302 (e.g., a device similar to electronic device 100, 200, 250), displaying, via a display generation component 214 (e.g., a display), a three-dimensional environment 304, and also illustrates a partial overhead view 325 of a physical environment and a three-dimensional environment 304 associated with electronic device 302. It is understood that while FIGS. 3A-3D illustrate the three-dimensional environment 304 being presented to the user by the electronic device 302 and displayed by the display generation component 214 of device 302, the three-dimensional environment 304 (and associated user interfaces) could also be implemented on a head-mounted display that includes a display generation component that displays the three-dimensional environment 304 to the user and sensors 313 to detect the physical environment movements of the user's hands (e.g., external sensors facing outwards from the user) and/or gaze of the user (e.g., internal sensors facing inwards towards the face of the user). It should also be understood that, in some examples, electronic device 302 utilizes one or more techniques described with reference to FIGS. 3A-3D in a two-dimensional environment without departing from the scope of the disclosure.

As shown in FIG. 3A, the electronic device 302 is displaying a three-dimensional environment 304 that includes a three-dimensional landscape 320 and user interface elements 306 and 308. As will be described in greater detail below, in some examples, the three-dimensional landscape 320 is optionally generated/updated based on two-dimensional content (e.g., two-dimensional photos) included in user interface element 306. In some examples, if a two-dimensional content/object has not yet or is not currently added to user interface element 306, the electronic device 302 displays a default landscape/background. For example, in FIG. 3A, no (zero) two-dimensional photos are currently added to user interface element 306, and as a result, the three-dimensional landscape 320 presented by electronic device 302 corresponds to a default landscape/background.

In some examples, when a default landscape/background is being presented in the three-dimensional environment 304, the electronic device displays, in the three-dimensional environment 304, portions of the environment (e.g., walls, floors, ceilings, etc.) where the electronic device 302 is physically located and/or displays representations of physical objects that are in the environment where the device is physically located (e.g., furniture, picture frames, tables, etc.). Additionally, or alternatively, in some examples, the electronic device 302 may also select a default landscape/background for display in the three-dimensional environment 304, such as a lake, mountain, sunset, sunrise, grassland, etc. In some examples, while the electronic device 302 is presenting a default landscape/background, the electronic device 101 is displaying a portion of the environment where the device is physically located (e.g., physical environment 102) and a three-dimensional landscape of a lake, mountain, sunset, sunrise, grassland, etc.

In some examples, the three-dimensional environment 304 includes a user interface element that includes two-dimensional photos/images that can be moved to or added to user interface element 306. For example, in FIG. 3A, the three-dimensional environment 304 includes user interface element 308. User interface element 308 includes a representation 310 of Landscape Photo 1, a representation 312 of Landscape Photo 2, and a representation 314 of Landscape Photo 3. In some examples, the electronic device 302 selects the landscape photos (e.g., photos contains representations of landforms, landscape assets, natural objects, non-natural elements, etc., as will be described in more detail later) corresponding to the representations 310-314 for display in user interface element 308 because those photos are available to the electronic device 302 via a photos application currently downloaded on the device, a public or private database, one or more web services, etc. In some examples, user interface element 308 is scrollable to display additional representations of landscape photos.

Additionally, as shown in FIG. 3A, the electronic device 302 receives a request to add the representation 314 of Photo 3 to a location in the user interface element 306 (indicated by hand 315 of the user 322 moving the representation 314 to the user interface element 306 via a dragging gesture). In some examples, if the electronic device 302 is a head mounted device, the representation 314 of Photo 3 is moved to a location in the user interface element 306 when the hand 315 of the user 322 performs a pinching gesture at a location in the physical environment corresponding to the location of representation 314 of Landscape Photo 3, followed by movement of the hand 315 to a location in the physical environment that corresponds to a location in the user interface element 306 where the user wishes to place/add the representation 314 of Landscape Photo 3. The pinching gesture can be released to place/add the representation 314 of Landscape Photo 3. In some examples, other poses of the hand may also be used to selected, add, and/or move a landscape image to the user interface element 306. For example, the representation of 314 of Landscape Photo 3 may optionally be added to a predetermined location in user interface element 306 when the hand 315 of the user 322 is in a "pointing" pose (e.g., one or more fingers of hand 315 are extended and one or more fingers of hand 315 are curled towards the palm of hand 315) while a gaze of the user 322 is optionally directed towards the representation 314.

In some examples, the user 322 of the electronic device 302 may wish to add the representation 314 of Landscape Photo 3 (or a representation of a different photo) to a location in the user interface element 306 that is not currently being presented by the electronic device 302 (e.g., a location in the user interface element 306 that is not currently in the user's field of view from the user's current viewpoint of the three-dimensional environment 304). For example, as illustrated in overhead view 325, user interface element 306 optionally occupies 360 degrees of space around the user's current viewpoint of the three-dimensional environment 304. Thus, in some examples, when the user's viewpoint of the three-dimensional environment changes (e.g., by detecting the rotation of the device or of the head and/or body of the user (e.g., concurrently with the rotation of the device)), different portions of user interface element 306 are optionally displayed in the three-dimensional landscape 304 (e.g., portions of the user interface element 306 that were not displayed when the user's viewpoint of the three-dimensional environment 304 corresponded to the viewpoint illustrated in FIG. 3A). In some examples, the user interface element 306 optionally occupies less than 360 degrees of space around the user's current viewpoint of the three-dimensional environment 304, such as 270 degrees of space, 180 degrees of space, 90 degrees of space, etc. As will be described in more detail in methods 400, 1100, and 1200, in some examples, the location of the photos in user interface 306 influence how the respective features of the photos are added to the three-dimensional landscape 320 generated based on the photos included in user interface 306.

Additionally, in some examples, the location of user interface element 308 is based on the user's viewpoint of the three-dimensional environment 304. For example, when the user's viewpoint of the three-dimensional environment 304 changes, the electronic device 302 updates the location of user interface elements 308 in the three-dimensional environment 304 to be displayed at or within a threshold distance (e.g., 0.1, 0.5, 1, 1.5, 3, 6 feet) from the user's updated viewpoint of the three-dimensional environment 304 and/or be displayed in a predetermined portion of the user's field of view from the user's updated viewpoint of the three-dimensional environment 304 (e.g., bottom-center, bottom-right, bottom-left, top-right, etc.). In some examples, user interface element 308 is displayed at a location in the three-dimensional environment 304 that is in the foreground (e.g., appears closer to the user relative to user interface element 308) and/or is within the boundaries of user interface element 308, as indicated in overhead view 325 in FIG. 3A.

Figure 3B:
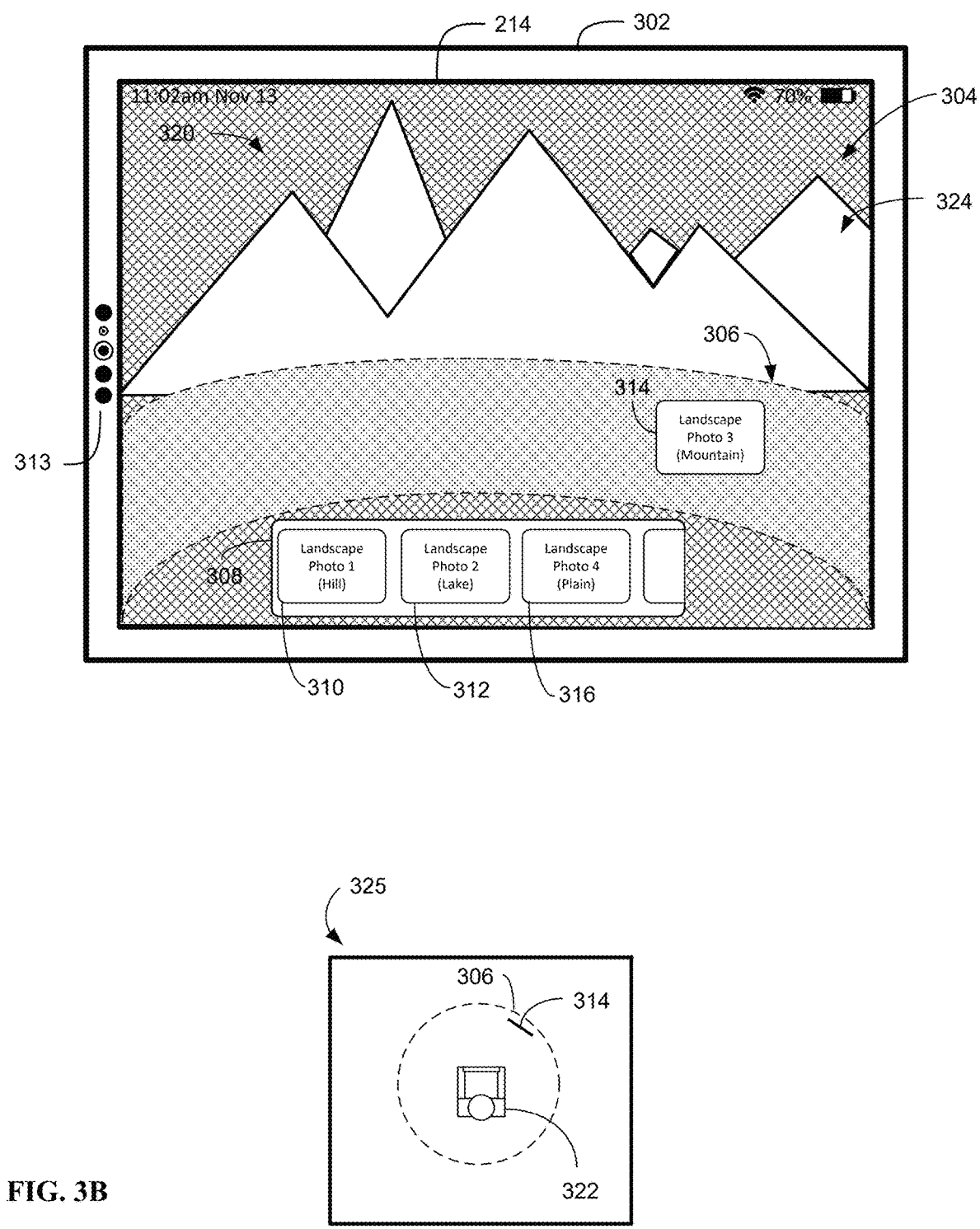

In FIG. 3B, in response to the electronic device 302 receiving the request to add the representation 314 of Landscape Photo 3 to the user interface element 306 in FIG. 3A, the representation 314 of Landscape Photo 3 is added to the user interface element 306 (at a location indicated in overhead view 325). Additionally, in FIG. 3B, in some examples, because Landscape Photo 3 was added to user interface element 306, the electronic device 302 replaces the display of the representation 314 of Landscape Photo 3 in user interface element 308 with the representation 316 of Landscape Photo 4. Conversely, in some examples, even after the representation 314 of Landscape Photo 3 is added to the user interface element 306, the representation 314 continues to be displayed at user interface element 308 such that the representation 314 is available to be added to other locations of user interface element 306.

In some examples, the landscape photos displayed in user interface element 308 that are able to be added to user interface element 306 are two-dimensional photos that include two-dimensional representations of landforms (e.g., valleys, plateaus, mountains, oceans, etc.), two-dimensional representations of landscape assets (e.g., plants, trees, grass, etc.), two-dimensional representations of environmental elements (e.g., natural objects, one or more clouds, a sky, sun, moon, etc.), and/or two-dimensional representations of non-natural elements (e.g., manmade objects, buildings, cars, trucks, people, etc.). In the example of FIG. 3B, Landscape Photo 3 (corresponding to representation 314) includes a first two-dimensional feature/element corresponding to a two-dimensional representation of a mountain, a second two-dimensional feature/element corresponding to a two-dimensional representation of a sky, and a third two-dimensional feature/element corresponding to a two-dimensional representation of a grassland. In some examples, Landscape Photo 3 includes the above features/elements because Landscape Photo 3 is a photo of a real-world location that includes these features/elements (e.g., optionally that was captured by user 322 or by a different user (e.g., optionally using image sensor 206)). In some examples, when the landscape photo(s) (e.g., landscape photo 3) is added to user interface element 306, the landscape photos can be displayed as three-dimensional photos (e.g., with the two-dimensional photo molded to the three-dimensional shape of user interface element 306).

In some examples, as previously mentioned, the three-dimensional landscape 320 is optionally generated/updated based on two-dimensional content (e.g., two-dimensional photos) that has been added to or moved to the user interface element 306. For example, in FIG. 3B, after adding the representation 314 of Landscape Photo 3 to the user interface element 306 (at the location indicated in overhead view 325), the three-dimensional landscape 320 is updated to include three-dimensional representations of the two-dimensional features/elements included in Landscape Photo 3. In particular, because Landscape Photo 3 included a two-representation of a sky, mountain, and grassland, the electronic device 302 updates the three-dimensional landscape 320 from the default landscape/background illustrated in FIG. 3A to include a three-dimensional representation 324 of mountains, a three-dimensional representation of a sky (optionally displayed at locations in the three-dimensional landscape 320 above and behind the three-dimensional representation 324 of mountains), and a three-dimensional representation of a grassland (optionally displayed at locations below and in front of the representation of the mountains). In some examples, when a photo is added to the user interface element 306, the three-dimensional landscape 320 is updated in real time or near real time (e.g., within 0.5, 0.1, 0.5, 1, 1.5, 2, 5, 10 seconds after the photo was added to the user interface element 306). In some examples, the three-dimensional landscape 320 is updated in response to additional user input (e.g., a user request to generate or update the three-dimensional landscape, a user request to close user interface element 308, etc.). The manner in which the three-dimensional representations of the features/elements in the three-dimensional landscape 320 are distributed, arranged, located, etc. (e.g., visual attributes) will be described in detail with reference to method 400.

In some examples, similar to user interface element 306, the three-dimensional landscape 320 extends and occupies locations in/portions of the three-dimensional environment 304 that are not currently in the field of view of user 322 (and optionally occupies 180 degrees, 360 degrees, or another suitable amount of space around the user's viewpoint of the three-dimensional environment). For example, if the three-dimensional landscape 320 is occupying 360 degrees of space around the user's viewpoint of the three-dimensional environment 304, different portions of the three-dimensional landscape 320 are optionally displayed when the user's viewpoint of the three-dimensional environment 304 changes (e.g., portions of the three-dimensional landscape 320 that were not included when the user's viewpoint of the three-dimensional environment corresponded to the viewpoint illustrated in FIG. 3B). In some examples, when a landscape photo is added to user interface element 306, only the portions of the three-dimensional landscape 320 that are currently in the user's field of view are updated, and the portions of the three-dimensional landscape 320 that were not included in the user's field of view are optionally not updated. In some examples, when a landscape photo is added to user interface element 306, portions of the three-dimensional landscape 320 that are currently outside the user's field of view are updated, but may be updated later to prioritize generation and rendering of the three-dimensional landscape within the user's field of view.

Figure 3C:
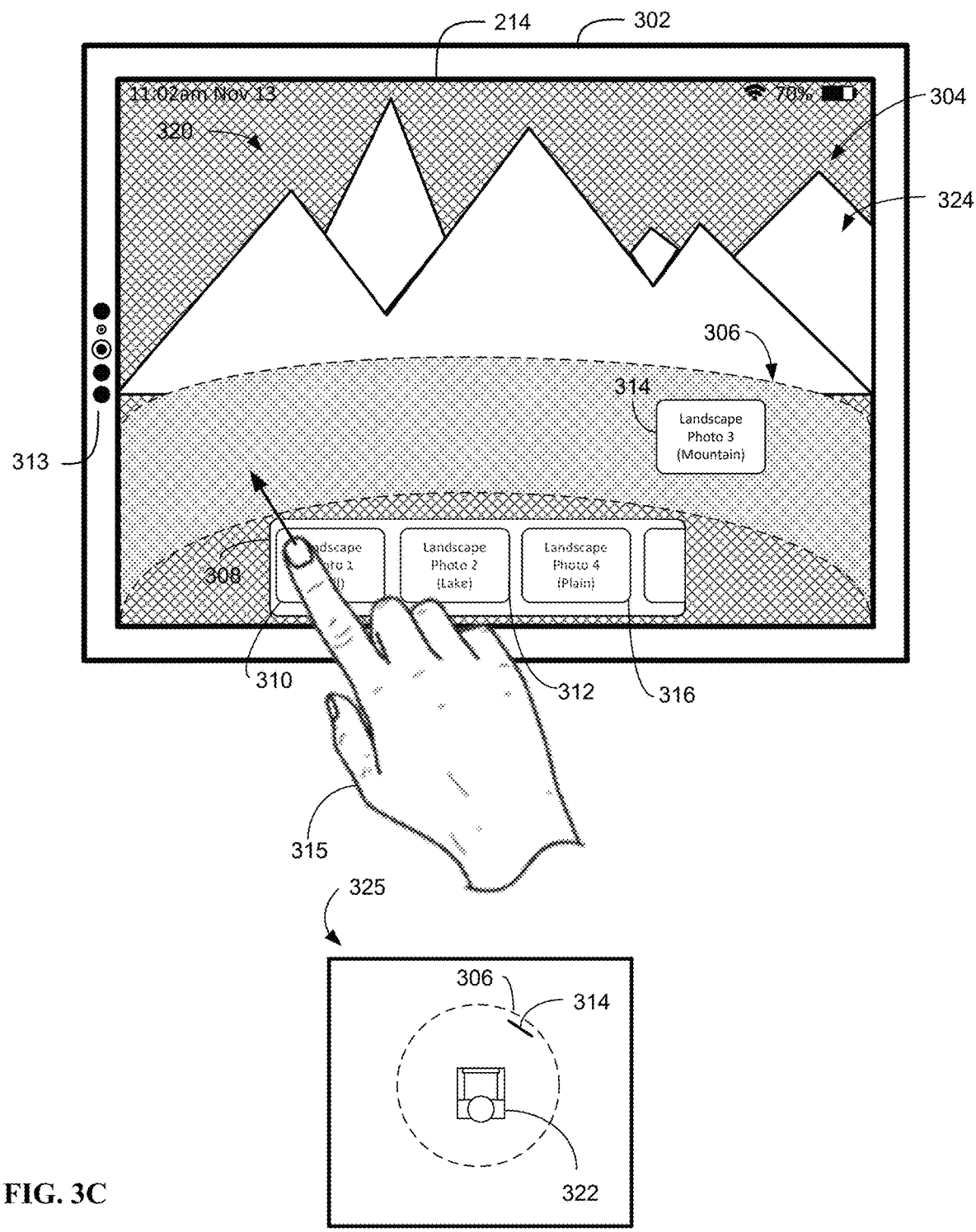

In some examples, the electronic device 302 detects a request to add another landscape photo to user interface element 306. For example, in FIG. 3C, while the three-dimensional landscape 320 is displaying the three-dimensional representations of features associated with Landscape Photo 3 (e.g., generated using the features of Landscape Photo 3 as placed at user interface element 306), the electronic device 302 receives a request to add the representation 310 of Landscape Photo 1 to a location in the user interface element 306. In FIG. 3C, the request indicated by hand 315 of the user 322 moving the representation 310 to a location in the user interface element 306 via a dragging gesture, but it is understood that other suitable gestures may be used (optionally including other means of selection, movement and/or deselection). As mentioned previously, in some examples, if the electronic device 302 is a head mounted device, the representation 310 of Photo 1 is optionally moved to the location in the user interface element 306 when the hand 315 of the user 322 performs a pinching gesture at a location in the physical environment corresponding to the representation 310 of Landscape Photo 1, followed by movement of the hand 315 to a location in the physical environment that corresponds to a location in the user interface element 306 where the user wishes to add the representation 310 of Landscape Photo 1. The pinching gesture can be released to place/add the representation 310 of Landscape Photo 1.

As mentioned previously, in some examples, the landscape photos added to user interface element 306 optionally include two-dimensional representations of landforms, two-dimensional representations of landscape assets, two-dimensional representation of environmental elements, and/or include non-environmental elements. In the example of FIG. 3C, Landscape Photo 1 includes a first two-dimensional feature/element corresponding to a two-dimensional representation of a hill and a second two-dimensional feature/element corresponding to a two-dimensional representation of a sky.

Figure 3D:
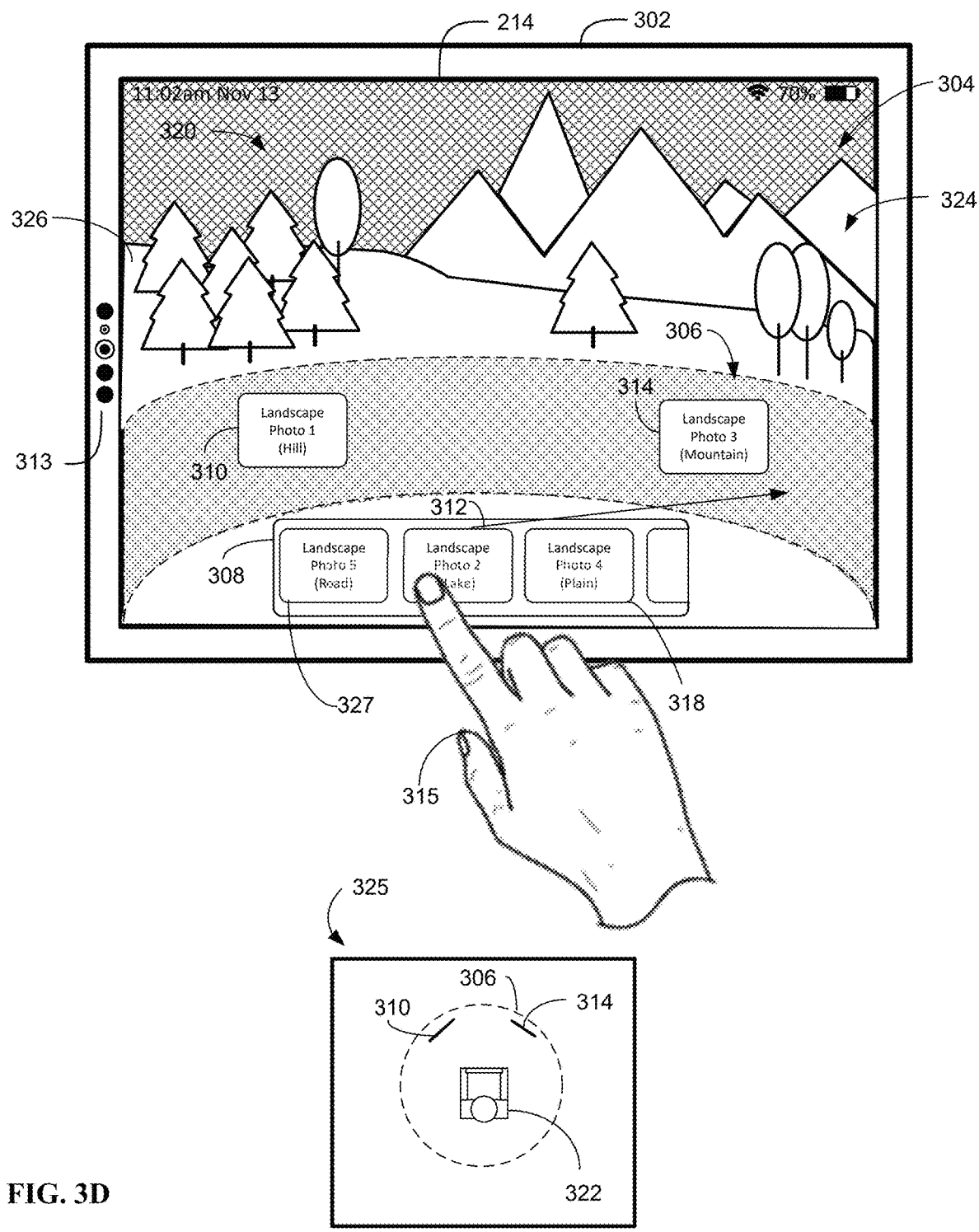

In FIG. 3D, in response to receiving the request to add the representation 310 of Landscape Photo 1 to the user interface element 306 in FIG. 3C, the electronic device 302 moves the representation 310 to a location in the user interface 306 indicated in overhead view 325. In some examples, when a new landscape photo is added to the user interface element 306 (or alternatively in response to further user input beyond adding the photo to user interface element 306), the three-dimensional landscape 320 is updated based on the features/elements associated with the newly added photo. For example, in FIG. 3D, after adding the representation 310 of Landscape Photo 1 to the user interface element 306, the electronic device updates the three-dimensional landscape 320 to include a three-dimensional representation 326 of hills because, as mentioned above, Landscape Photo 1 includes a two-dimensional representation of hills. In some examples, display (visual) attributes/characteristics and the distribution of the three-dimensional representation 326 of hills in the three-dimensional landscape 320 is based on one or more machine learning models, as will be described in more detail with reference to method 400.

In some examples, after adding a new landscape photo to user interface 306, the distribution of three-dimensional features/elements previously included in the three-dimensional landscape 320 is also updated (e.g., the features/elements included the three-dimensional landscape 320 prior to adding a new landscape photo). For example, in FIG. 3D, after adding the representation 310 of Landscape Photo 1 to the user interface element 306, the distribution of the three-dimensional representation 324 of mountains in the three-dimensional landscape 320 is different when compared to FIG. 3C. In particular, in FIG. 3C, when the three-dimensional landscape 320 was not yet based on Landscape Photo 1, the three-dimensional representation 324 of mountains were distributed in the three-dimensional landscape 320 such that the three-dimensional representation 324 of mountains were occupying a first amount of space (e.g., in the user's field of view) of the three-dimensional landscape 320. After the representation 310 of Landscape Photo 1 was added to user interface element 306 in FIG. 3D, the electronic device 302 updates the three-dimensional landscape 320 such that the three-dimensional representation 324 of the mountains occupies a smaller amount of space in three-dimensional landscape 320 when compared to FIG. 3C. Additionally, after adding the representation 310 of Landscape Photo 1 to the user interface element 306, the electronic device 302 also shifted the location of the three-dimensional representation 324 of the mountains to the right relative to the location of the representation 324 of the mountains in the three-dimensional landscape 320 in FIG. 3C (or alternatively, areas/regions of the three-dimensional landscape previously including representation 324 of the mountains may now include representations 326 of the hills). Although described above as changing the amount or position of three-dimensional features/elements when adding an additional two-dimensional photo, it is understood that the distribution of other three-dimensional features/elements in the three-dimensional landscape 320 may also be updated after adding Landscape Photo 1 to the user interface element 306. Further details about how feature/elements in the three-dimensional landscape 320 are distributed will be described in more detail with reference to method 400.

In some examples, the three-dimensional landscape 320 also includes simulated elements/features (e.g., simulated assets) that were not included in the landscape photos located at user interface element 306 (or that were included in the landscape photos in a different distribution). For example, in FIG. 3D, the three-dimensional landscape 320 includes a plurality of three-dimensional representations of a plurality of trees that are positioned at locations on the three-dimensional representation 326 of the hills (or optionally on mountains, plains, etc. as provided in the three-dimensional landscape). In the example of FIG. 3D, the plurality of representations of the plurality of trees were not necessarily added because Landscape Photo 1 or Landscape Photo 3 included a feature/element associated with trees, but rather may have been added to the three-dimensional landscape 320 in a simulated fashion to augment the three-dimensional environment in to better reflect a natural environment. In some examples, certain types of assets can be simulated and added to the three-dimensional landscape 320, such as foliage assets (e.g., plants, trees, vegetation, flowers, etc.), animate assets (e.g., people, animals, insects, etc.), manmade/inanimate assets (e.g., cars, rocks, sidewalks, streetlamps, etc.). In some examples, certain types of simulated assets are added to certain types of features/elements in the three-dimensional landscape 320. For example, in FIG. 3D, simulated assets associated with cars, streetlamps, etc. may not be added to elements/features associated with natural landscapes (e.g., mountains or hills), but may be able to add to elements/features in the three-dimensional landscape that correspond to man-made landscape (e.g., cityscape) including roads, intersections, etc. (e.g., if the three-dimensional landscape 320 included such an element/feature). In some examples, the types of simulated assets may be user selected and/or may not be restricted based on type of features/elements in the three-dimensional landscape.

Further, as illustrated in FIG. 3D, after adding Landscape Photo 1 to the user interface element 306, the electronic device 302 optionally replaces the display of the representation 310 of Landscape Photo 1 in user interface element 308 (as illustrated in FIG. 3C) with the representation 327 of Landscape Photo 5. Although FIGS. 3A-3D illustrate the addition of two-dimensional photos to user interface element 306, it is understood that additional photos/images could be added to user interface element 306, and in response the electronic device updates the three-dimensional landscape 320 in an analogous manner as described above.

Figure 4A:
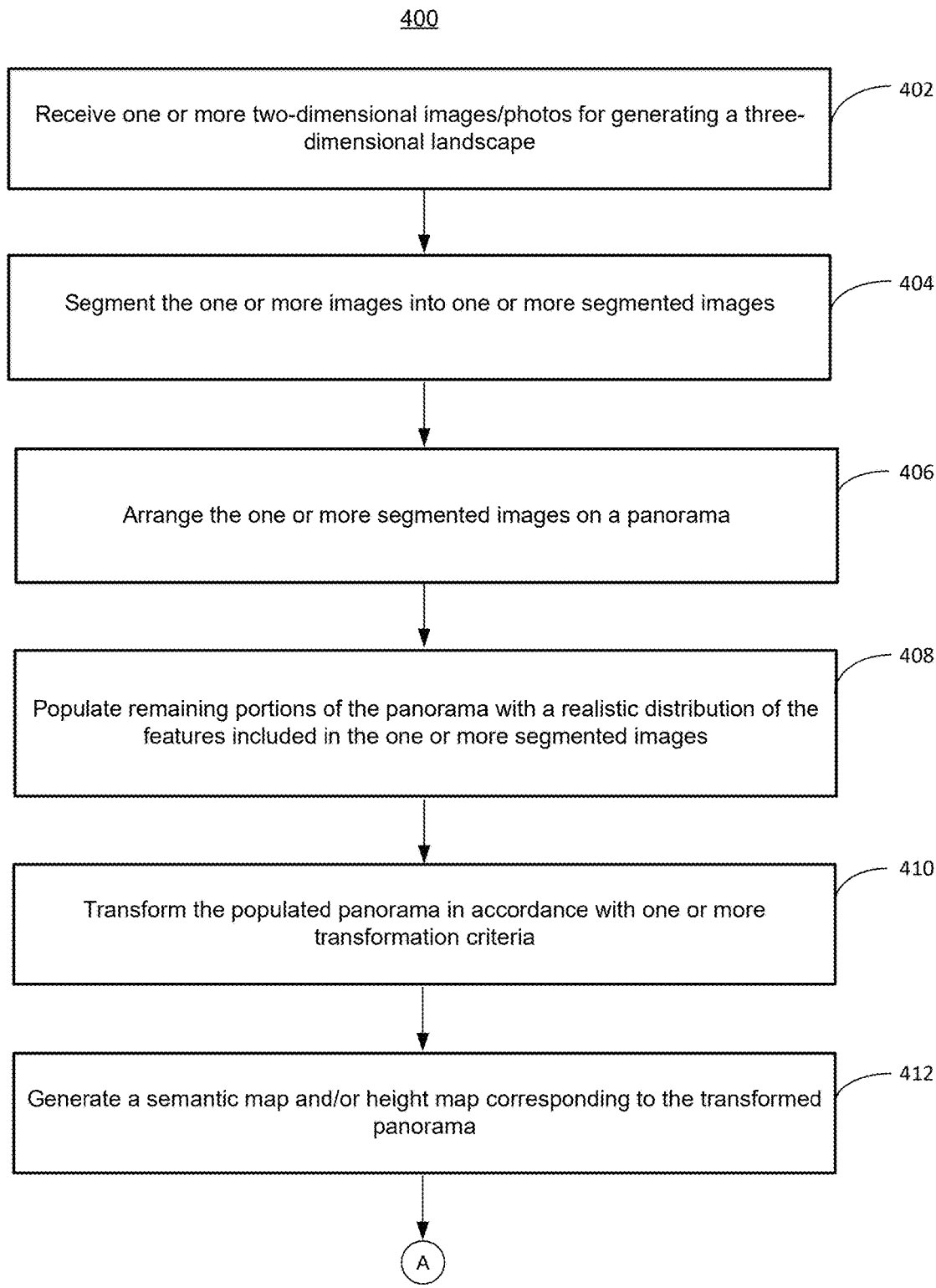
FIGS. 4A-4B illustrate an exemplary method 400 for constructing a three-dimensional landscape in accordance with some examples of the disclosure.
Figure 4B:
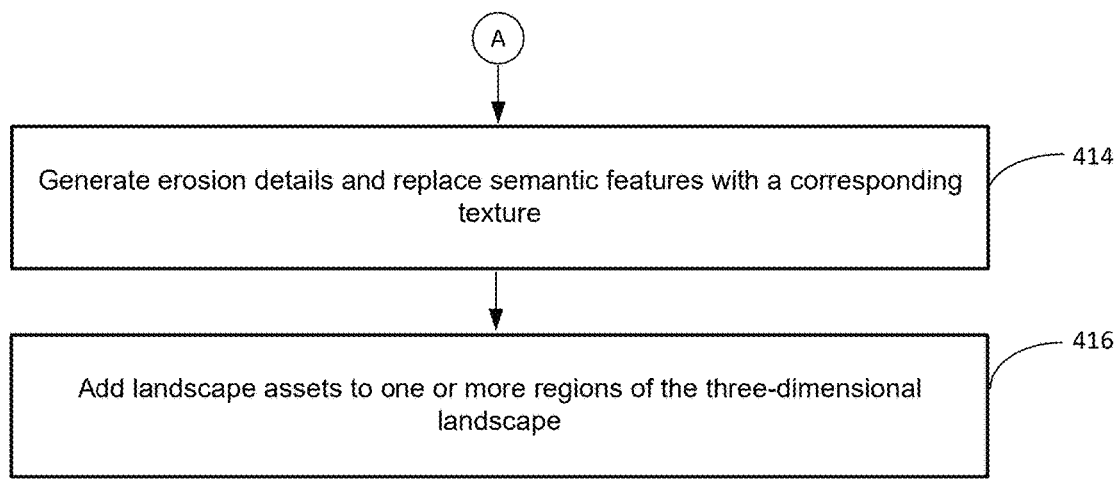

FIGS. 4A-4B illustrate an exemplary method 400 for constructing a three-dimensional landscape in accordance with some examples of the disclosure (e.g., such as the three-dimensional landscape 320 described in FIGS. 3A-3D). In some examples, the method 400 is performed at a computer system (e.g., system 200 in FIG. 2A such as a tablet, smartphone, wearable computer, or head mounted device) including a display generation component (e.g., display generation component 214 in FIG. 2A (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some examples, the method 400 is governed by instructions that are stored in a non-transitory computer-readable storage medium and that are executed by one or more processors of a computer system, such as the one or more processors 218 of system 200. Some operations in method 400 are optionally combined and/or omitted. In some examples, the order of some operations in method 400 are optionally changed.

In FIG. 4A, method 400 includes, at block 402, receiving one or more two-dimensional images/photos for generating a three-dimensional landscape (e.g., similar to three-dimensional landscape 320). In some examples, an electronic device (e.g., electronic device 302 in FIGS. 3A-3D) receives the one or more two-dimensional images/photos while the electronic device is presenting one or more two-dimensional objects/user interfaces (and optionally not one or more three-dimensional objects/user interfaces). For example, the one or more two-dimensional images/photos are optionally received, by the electronic device, when the one or more two-dimensional images/photos are added to or moved to respective locations in a two-dimensional user interface. In some examples, the one or more two-dimensional photos are optionally added to or moved to the two-dimensional user interface when a user of the electronic device selects the one or more two-dimensional photos (e.g., via mouse input, touch input or other suitable input) and subsequently moves the one or more two-dimensional photos to one or more respective locations in the two-dimensional user interface and deselects the one or more two-dimensional photos (e.g., via a drag and drop gesture).

In some examples, the electronic device can also receive the request to generate the three-dimensional landscape based on the one or more two-dimensional images/photos when the electronic device is presenting a three-dimensional environment, such as when the electronic device receives a request to add the one or two-dimensional photo/images to the three-dimensional user interface element 306, as described in FIGS. 3A-3D. In some examples, the two-dimensional images/photos include environmental (e.g., natural landscape) features (e.g., trees, mountains, clouds, hills, etc.) and non-environmental (e.g., non-natural landscape) features (e.g., buildings, people, cars, trucks, etc.).

Figure 5A:
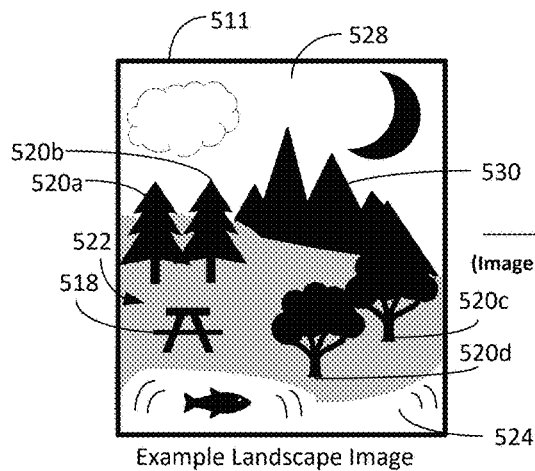
FIGS. 5(a)-5(d) illustrate an example inputs and outputs of an image segmentation model and a generative adversarial network in accordance with some examples of the disclosure.

At block 404, after receiving the one or more two-dimensional images/photos at block 404, the electronic device optionally segments the one or more two-dimensional images/photos into one or more segmented images. In some examples, the one or more two-dimensional images/photos received at block 402 are segmented using an image segmentation machine learning model. In some examples, the image segmentation machine learning model is a neural network, such as a recurrent neural network (RNN), convolutional neural network (CNN), artificial neural network (ANN), etc. In some examples, the image segmentation model is trained to recognize (e.g., classify) environmental features (e.g., sky, water, foliage, gravel, mountains, hills, etc.) and/or non-environmental features (e.g., buildings, people, vehicles, etc.) included in the two-dimensional image/photo. In some examples, the image segmentation model is trained to recognize (e.g., classify) environmental features (e.g., sky, water, foliage, gravel, mountains, hills, etc.), and exclude non-environmental features (e.g., buildings, people, vehicles, etc.) included in the two-dimensional image/photo (e.g., classify all features not included in the class of environmental features as non-environmental). In some examples, the image segmentation model is trained to recognize (e.g., classify) environmental features of landscapes (e.g., sky, water, mountains, hills, plains, etc.) and exclude environmental assets (e.g., trees, foliage, rocks, etc.). For example, in FIG. 5(a), an exemplary two-dimensional landscape photo 511 (optionally received at block 402) is illustrated. The two-dimensional landscape photo 511 includes a representation 522 of a hill (which includes, at respective locations on the hill, representations 520a-520d of trees and a representation 518 of a picnic table). Additionally, the two-dimensional landscape photo 511 also includes a representation 524 of a lake, a representation 530 of mountains, and a representation 524 of a sky (which includes, at respective locations in the sky, a representation 526 of a cloud and a representation 528 of a moon).

Figure 5B:
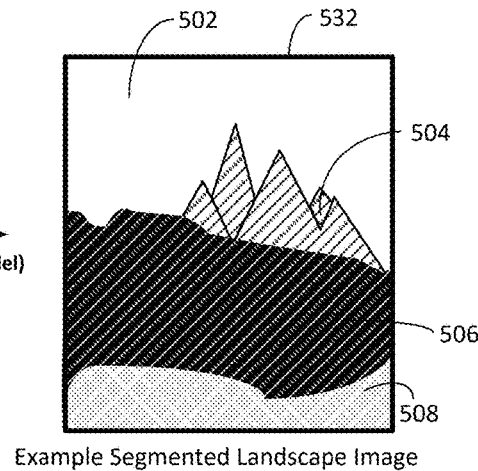

FIG. 5(b) illustrates segmented image/photo 532, which is an example output of the image segmentation model when the two-dimensional landscape photo 511 is provided to the image segmentation model as input. In some examples, each pixel in the output image of the image segmentation model is assigned a value (optionally color-coded) representative of a particular classification feature/element. For example, in FIG. 5(b), the image segmentation model identified (e.g., classified) that the pixels associated with the representation 524 of the lake in the two-dimensional landscape photo 511 relate to properties of a body of water (e.g., a water classification feature/element). As such, the pixels in the segmented photo 532 that correspond to the representation 524 of the lake are represented (e.g., with a classification value or color-coded) with cross hatch 508 (e.g., a cross hatch corresponding to a body of water feature/element). Similarly, the image segmentation model also identified that the pixels associated with the representation 522 in the two-dimensional landscape photo 511 relate to properties of area hill (or plain), that the pixels associated with the representation 530 in the two-dimensional landscape photo 511 relate to properties of a mountain, and that the representation 528 in the two-dimensional landscape photo 511 relate to properties of a sky. Accordingly, the pixels in the segmented photo 532 that correspond to the representation 522 of the hill are represented (e.g., with a classification value or color-coded) with cross hatch 506 (e.g., a cross hatch corresponding to a hill (or plain) feature/element), the pixels in the segmented photo 532 that correspond to the representation 530 of the mountains are represented (e.g., with a classification value or color-coded) with cross hatch 504 (e.g., a cross hatch corresponding to a mountain feature/element), and the pixels in the segmented photo 532 that correspond to the representation 528 of the sky are represented (e.g., with a classification value or color-coded) with background color 502 (e.g., a color corresponding to a sky feature/element). In some examples, non-classified pixels are omitted or are represented based on a surrounding or proximate natural landscape feature. For example, representation 518 of a picnic table is represented using the classification for a hill and representations 520a-520d of trees are represented using the classification for a hill, sky, and/or mountain.

In some examples, a composite image can be generated using the one or more segmented images after segmentation. In some examples, a panorama image can be generated using the one or more segmented images. For example, at block 406, after segmenting the one or two-dimensional images/photos in block 404, the electronic device arranges the one or more segmented images onto an incomplete (segmented) panoramic representation of a three-dimensional landscape. For example, in FIG. 5(c), segmented photos 510 and 512 (e.g., similar to segmented photo 532) are arranged onto an incomplete (segmented) panoramic representation 514 of a three-dimensional landscape (e.g., the three-dimensional landscape being generated by the electronic device). In some examples, the segmented photos 510 and 512 are arranged at locations in the incomplete panoramic representation 514 based on the locations at which the photos corresponding to segmented photos 510 and 512 were added to a user interface element, as described with reference at 402 (e.g., the locations corresponding to the placement of two-dimensional photos with respect to user interface element 306). For example, segmented photo 510 is optionally at the location in the incomplete panoramic representation 514 indicated in FIG. 5(c) because that location corresponds to a location at which a corresponding two-dimensional image was added to user interface element 306 (as described in FIGS. 3A-3D). Similarly, segmented photo 512 is optionally also at the location in the incomplete panoramic representation 514 indicated in FIG. 5(c) because that location corresponds to a location at which a corresponding two-dimensional image was added to user interface element 306. In some examples, the panoramic representation 514 is referred to as an incomplete (segmented) panoramic representation of a three-dimensional landscape because the panoramic representation of the three-dimensional landscape includes areas/regions that do not correspond to a segmented feature/element (indicated by the open/gray regions 517 in panoramic representation 514).

Figure 5C:
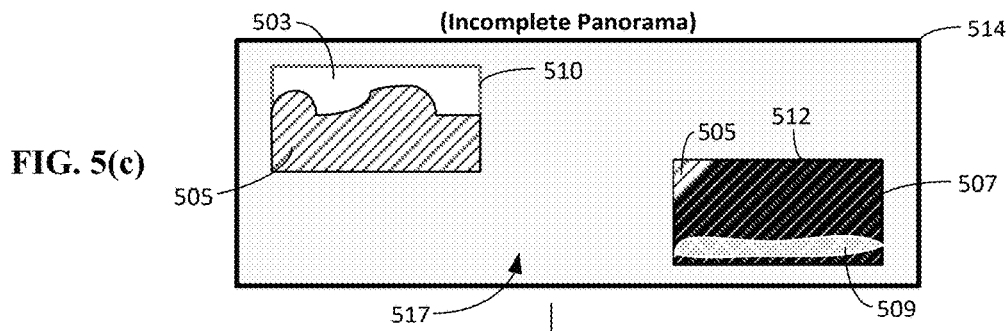

The incomplete panoramic representation 514 includes segmented features from the segmented photos 510 and 512. Segmented photo 510 includes a first segmented feature 503 associated with properties of a sky (indicated in segmented photo 510 as the background color white) and a second segmented feature 505 associated with properties of a mountain (indicated in segmented photo 510 as the cross hatch with the white background and black lines). Similarly, segmented photo 512 includes a first segmented feature 505 associated with properties of a mountain (indicated in the segmented photo 512 as the cross hatch with a white background and back lines), a second segmented feature 507 associated with properties of a foliage area (indicated in segmented photo 512 as the cross hatch with the black background and white lines), and a third segmented feature 509 associated with properties of a body of water (indicated in segmented photo 512 as the cross hatch with the gray background and white lines). Although FIG. 5(c) illustrates two segmented photos 510 and 512, it is understood the incomplete panoramic representation can include one segmented photo or more than two segmented photos.

Figure 5D:
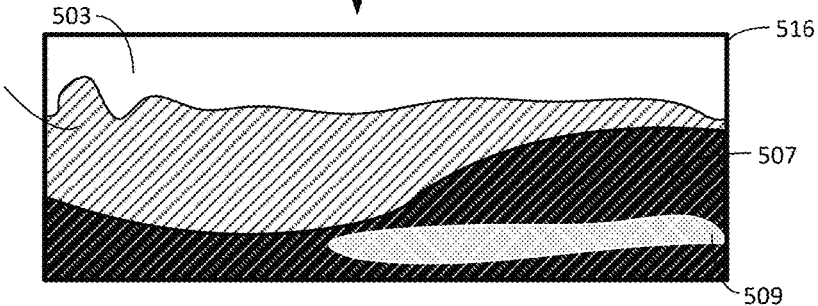

At block 408, after the electronic device arranges the segmented photos on an incomplete (segmented) panoramic representation of the three-dimensional landscape in block 406, the electronic device generates a completed (segmented) panoramic representation of the three-dimensional landscape. In some examples, a generative adversarial network (GAN) is used to generate the completed panoramic representation of the three-dimensional landscape. For example, the generative adversarial network may receive, as input, the incomplete panoramic representation 514 in FIG. 5(c), and output a completed (segmented) panoramic representation 516 of the three-dimensional landscape, as shown in FIG. 5(d). It is understood that other machine learning models or networks could also be used to generate a completed (segmented) panoramic representation of the three-dimensional landscape, such as a recurrent neural network (RNN), convolutional neural network (CNN), artificial neural network (ANN), etc.

In some examples, the segmented features of the incomplete panoramic representation are distributed in the completed panoramic representation in a manner defined by the generative adversarial network. For example, in FIG. 5(d), the generative adversarial network distributes the segmented features 503-509 (e.g., the segmented features included in incomplete segmented panoramic representation 514 in FIG. 5(c)) in the completed panoramic representation 516 such that locations in the completed panoramic representation 516 correspond to a segmented feature, and such that, the segmented features 503, 505, 507, and 509 are realistically distributed in the completed panoramic representation 516 (e.g., the GAN does not distribute the segmented features in a manner that would appear fake, not accurate, not realistic, etc.). That is, the GAN optionally distributes segmented features in a completed panoramic representation such that the locations of the segmented features appear natural (e.g., segmented features of hills and mountains are not shown at locations above a segmented feature of a sky, etc.).

In some examples, the generative adversarial network is trained based on a dataset that includes a plurality of true (e.g., real) panoramic representations of three-dimensional landscapes and a plurality of corresponding incomplete segmented panoramic representations associated with the true panoramic representation. For example, while training the generative adversarial network, the incomplete panoramic representation may be provided as a condition (optionally together with a noise vector) to the generative adversarial network. In response, a generator of the generative adversarial network generates, as output, a complete (segmented) panoramic representation of the three-dimensional landscape based on the input provided. The output from the generator (e.g., the generated panoramic representation) is then provided to a discriminator network along with the corresponding real (e.g., true) panoramic representation from the data set to predict which panoramic representation came from the data set and which one was generated by the generator. This "adversarial" process may be completed over one or more training runs (e.g., epochs), thus causing the generator to eventually generate plausible and realistic panoramic representations from incomplete panoramic representations.

At block 410, after generating a composite image using the one or more segmented images (e.g., after generating a completed (segmented) panoramic representation of a three-dimensional landscape at block 408), the composite image is optionally transformed in accordance with one or more transformation operations (e.g., is transformed into an input that will be accepted by a machine learning model configured to generate a two-dimensional semantic map of the three-dimensional landscape, as will be described at block 412).

Figure 6A:
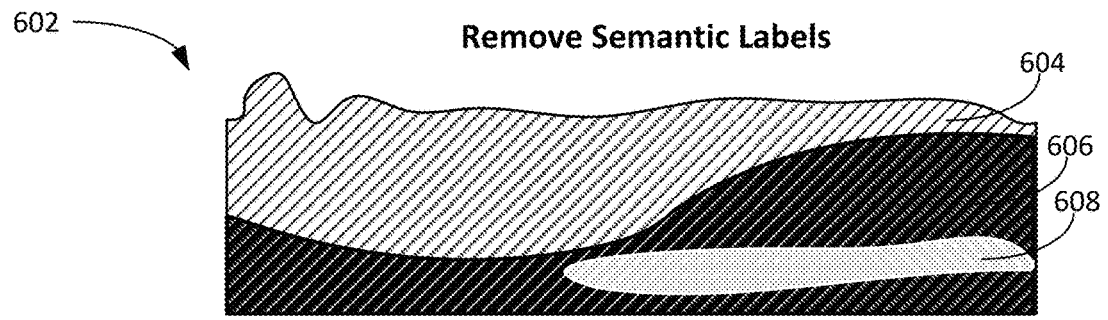
FIGS. 6(a)-6(b) illustrate example transformations that are optionally applied to a completed panoramic representation of a three-dimensional landscape.

In some examples, transforming the completed panoramic representation of the three-dimensional landscape includes removing one or more segmented features from the completed (segmented) panoramic representation. For example, in FIG. 6(a), a transformed (segmented) panoramic representation 602 is illustrated. In the transformed panoramic representation 602, the segmented feature corresponding to the sky has been removed from the panoramic representation (e.g., the segmented feature 503 illustrated in FIG. 5(d) has been removed in the transformed panoramic representation 602). Accordingly, after removing the segmented feature corresponding to the sky, the transformed (segmented) panoramic representation 602 includes a segmented feature 604 associated with properties of mountains, a segmented feature 606 associated with properties of hills/foliage areas, and a segmented feature 608 associated with properties of bodies of water (but does not include a segmented feature associated with properties of a sky).

Figure 6B:
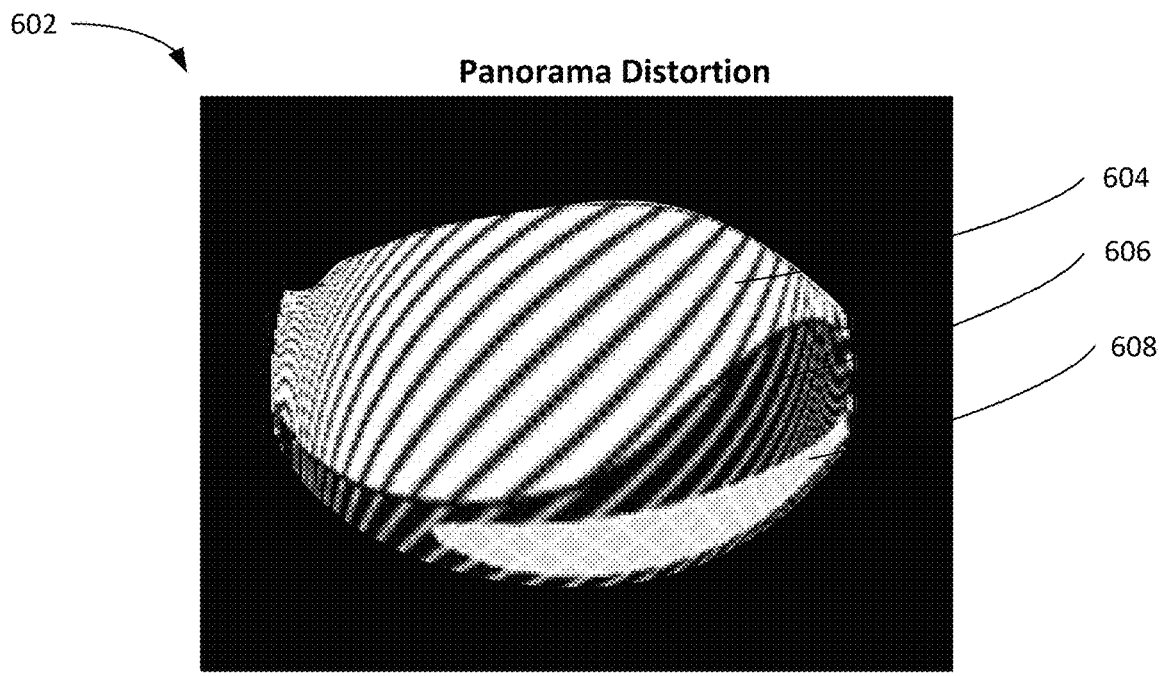

In some examples, transforming the completed panoramic representation of the three-dimensional landscape further includes applying a linear and/or non-linear transformation after removing one or more segmented features from the completed (segmented) panoramic representation. For example, FIG. 6(b) shows the result of the transformed panoramic representation 602 after another transformation was applied to the transformed panoramic representation in FIG. 6(a). In particular, in FIG. 6(b), the transformed panoramic representation 602 in FIG. 6(a) was further transformed such that the magnification of the transformed panoramic representation 602 in FIG. 6(b) decreases based on a distance from a center axis (e.g., to appear wrapped around a sphere). In some examples, such a transformation causes the transformed panoramic representation 602 to be represented in a polar coordinate system (as opposed to a cartesian coordinate system in FIG. 6(a)).

At block 412, after transforming the completed panoramic representation at 410, a semantic ground map and/or height map of a three-dimensional landscape corresponding to the transformed panoramic representation may be generated. In some examples, the corresponding semantic ground map and/or height map is generated with one or more machine learning models, such as a linear regression model, a recurrent neural network (RNN), convolutional neural network (CNN), artificial neural network (ANN), generative adversarial network (GAN), etc. For example, the transformed panoramic representation 602 in FIG. 6(b) may be provided, as input, to a generative adversarial network that is trained to produce, as output, a corresponding two-dimensional semantic ground map 702 (with sematic features/elements represented with values or color-coded as described herein) and/or a corresponding two-dimensional height map 710 (e.g., with height represented with values or color-coded, and/or optionally represented with normalized values or grayscale), as illustrated in FIGS. 7(a) and 7(b).

Figure 7A:
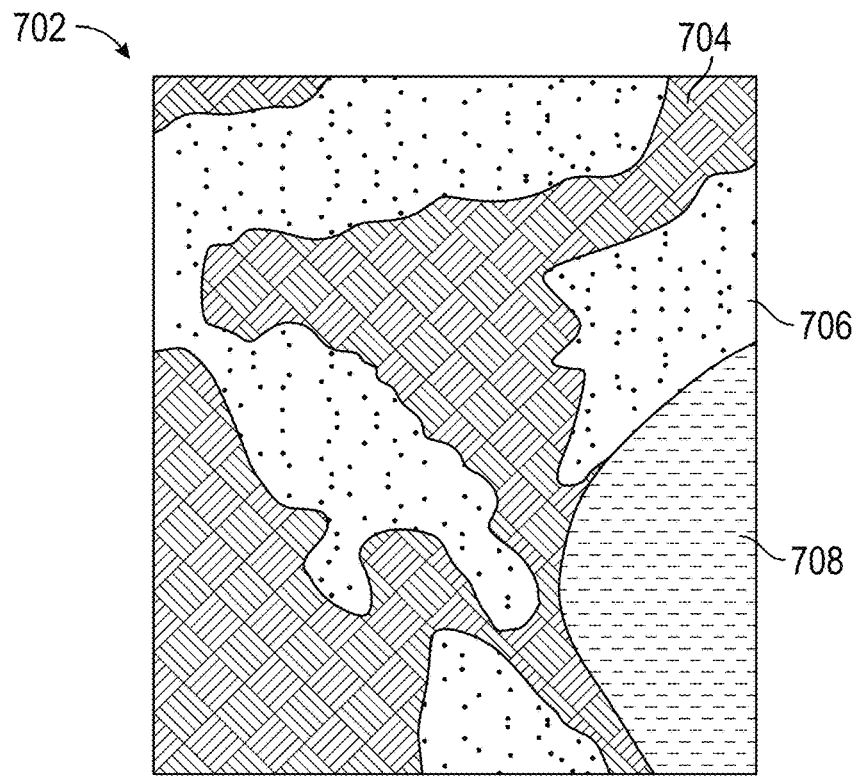
FIGS. 7(a)-7(b) illustrate an example two-dimensional semantic ground map and height map of a three-dimensional landscape.
Figure 7B:
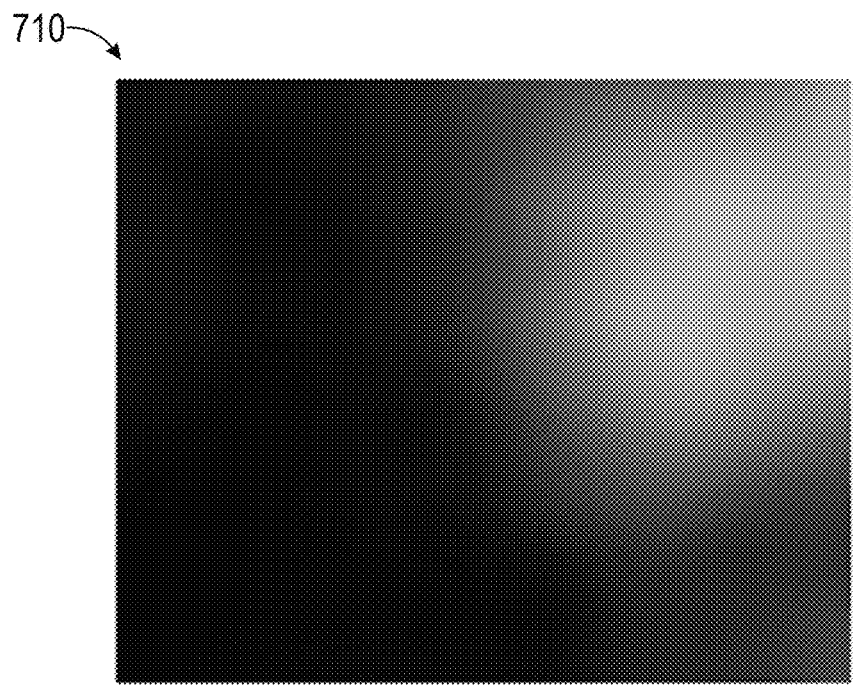

FIG. 7(a) shows an example semantic ground map 702 that is provided, as output, by the generative adversarial network when the transformed panoramic representation 602 in FIG. 6(b) is provided to the generative adversarial network as input. In some examples, semantic ground map 702 is a two-dimensional representation that defines the spatial locations of the segmented features in the three-dimensional landscape relative to ground. For example, semantic ground map 702 defines the spatial locations of segmented features 704, 706, and 708 (corresponding to the segmented features 604, 606, and 608 in FIG. 6(b), respectively) relative to ground and the locations of the segmented features 604, 606, and 608 relative to each other. Specifically, in FIG. 7(a), semantic ground map 702 illustrates that segmented feature 708 (which is associated with properties of a body of water) is spatially located in the three-dimensional landscape (relative to ground) at locations indicated in semantic ground map 702. Additionally, semantic ground map 702 also illustrates that segmented features 704 and 706 (corresponding to the segmented feature 704 associated with properties of a mountain and segmented feature 706 associated with properties of a hill/plain area, respectively) are located in the three-dimensional landscape (relative to ground) at locations indicated in the semantic ground map 702.

In some examples, the generative adversarial network also produces, as output, a two-dimensional height map for the three-dimensional landscape when the generative adversarial network is provided, as input, a panoramic representation that was transformed in accordance with block 410. For example, the generative adversarial network may produce, as output, two-dimensional height map 710 when the transformed panoramic representation 602 in FIG. 6(b) is provided to the generative adversarial network as input. In some examples, height map 710 defines the height (elevation) of the segmented features in the semantic ground map 1102. For example, the location of individual pixels in the height map 1110 may be associated with a particular X and Y location in the semantic ground map 702, and the value/color of the respective pixel may correspond to the height of that X and Y location in semantic ground map 702. Thus, in the example of FIGS. 7(a) and 7(b), a top right pixel in the height map 710 optionally corresponds to an X and Y location in the top right of the semantic ground map 702, and the height (e.g., elevation) of that X and Y location in the semantic ground map 702 is based on the value/color (e.g., with white representing the maximum normalized height and black representing the minimum normalized height) of the top right pixel in the height map 710.

Figure 7C:
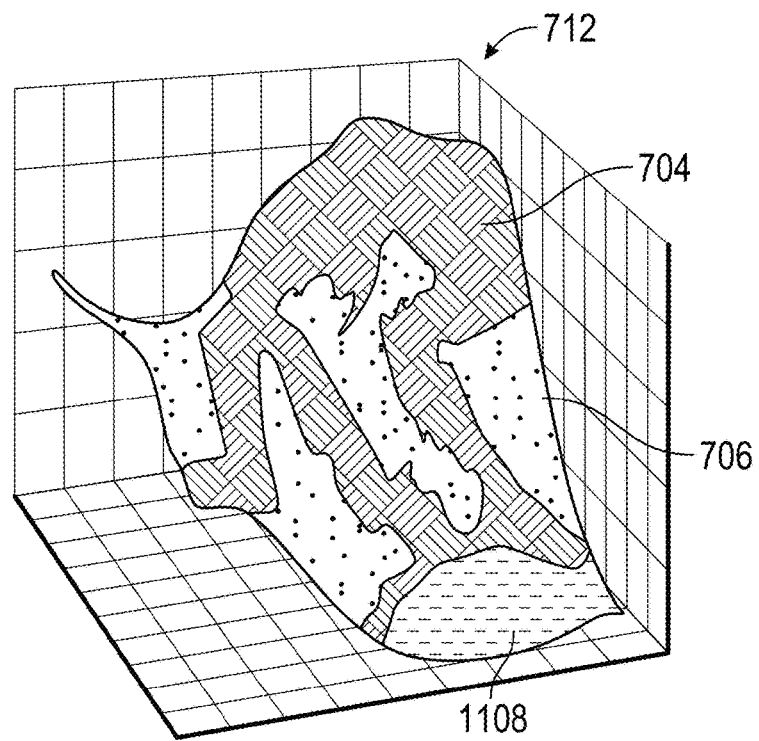
FIG. 7(c) illustrates an example three-dimensional semantic landscape that was generated based on a two-dimensional semantic ground map and a two-dimensional height map.

In some examples, the electronic device uses a semantic ground map and a height map to construct/define a three-dimensional semantic landscape. For example, the electronic device may transform the semantic ground map 702 into the three-dimensional sematic landscape 712 shown in FIG. 7(c) by updating, pixel-by-pixel, and/or scaling the semantic ground map 702 to include the height information defined by the height map 710. Thus, as illustrated in FIG. 7(c), the segmented features 704-708 in the semantic ground map 702 may be represented in three-dimensions in the three-dimensional semantic landscape 712 based on a height map outputted by a generative adversarial network (or other suitable machine learning model).

Figures 8A, 8B:
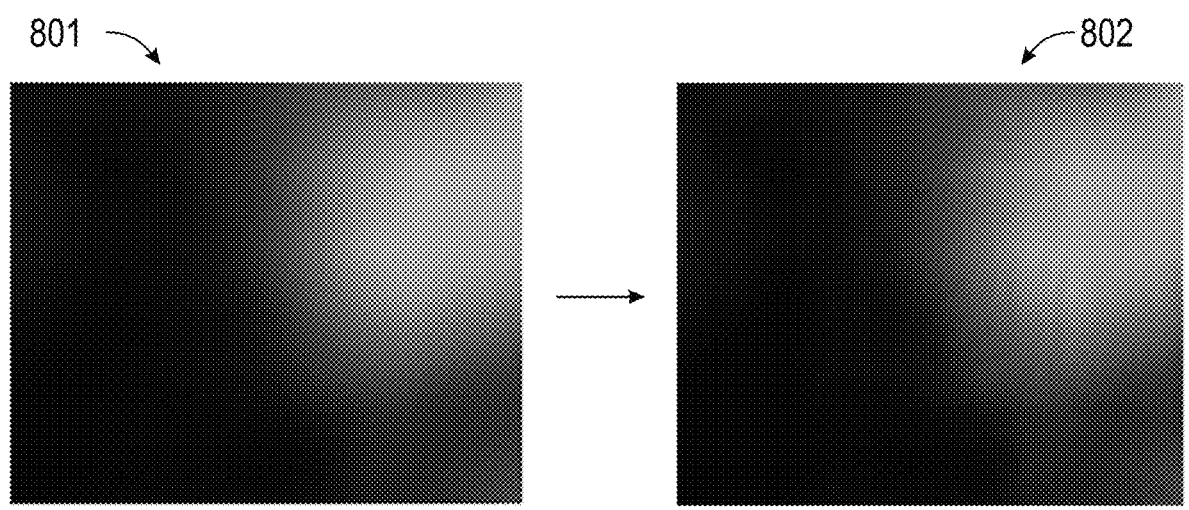
FIGS. 8(a)-8(b) illustrate an example of using a two-dimensional height map to generate erosion information for a three-dimensional landscape.
Figure 8D:
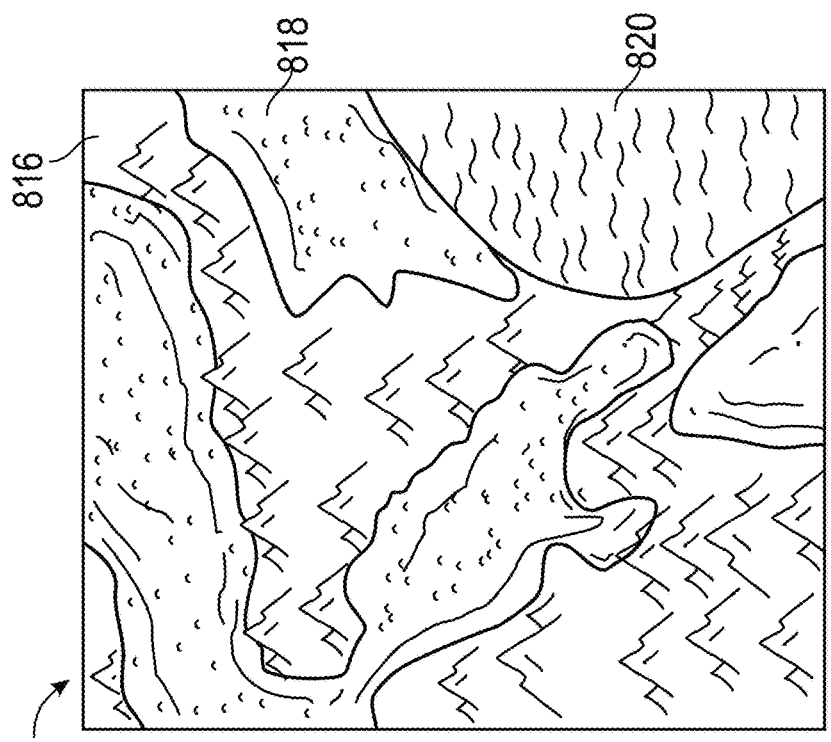
FIGS. 8(c)-8(d) illustrate an example result of replacing one or more regions of a semantic ground map with one or more realistic textures.

At block 414, after generating the semantic ground map and the height map at block 414, the semantic ground map and/or the height map may be used to generate erosion details/information for the three-dimensional landscape (e.g., fluvial lines). Additionally, or alternatively, at block 414, the semantic ground map and/or the height map may be used to replace areas of the semantic ground map with a corresponding texture/mesh. In some examples, the height map may be used to generate erosion details/information for the three-dimensional landscape without use of the semantic ground map, and the semantic ground map may be used for replacement of areas of the semantic ground map with a corresponding texture/mesh without use of the height map. In some examples, erosion details for the three-dimensional landscape are generated with one or more machine learning models (e.g., a linear regression model, recurrent neural network (RNN), convolutional neural network (CNN), artificial neural network (ANN), generative adversarial network (GAN), etc.). For example, the height map 801 illustrated in FIG. 8(a) (e.g., a height map similar to FIG. 7(b)) may be provided, as input, to a machine learning model, and produce, as output, a modified (e.g., second) height map 802 of the three-dimensional landscape defines erosion lines for the three-dimensional landscape. Modified height map 802 optionally has one or more similar characteristics of height map 710 in FIG. 7(b) (e.g., is a two-dimensional map optionally representing height using grayscale values). For example, the location of the pixels in the modified height map 802 may be associated with a particular X and Y location in the semantic ground map 702, and the color of the pixels in the modified height map 802 may correspond to a respective amount of erosion at that X and Y location in semantic ground map 702 (e.g., the corresponding location in the semantic ground map has a higher amount of erosion the darker the color of the pixel is, and has a lower amount of erosion or no erosion the lighter the color of the pixel is). As will be described later, in some examples, the electronic device constructs and/or updates a three-dimensional landscape based on the erosion information included in modified height map 802.

Figure 8C:
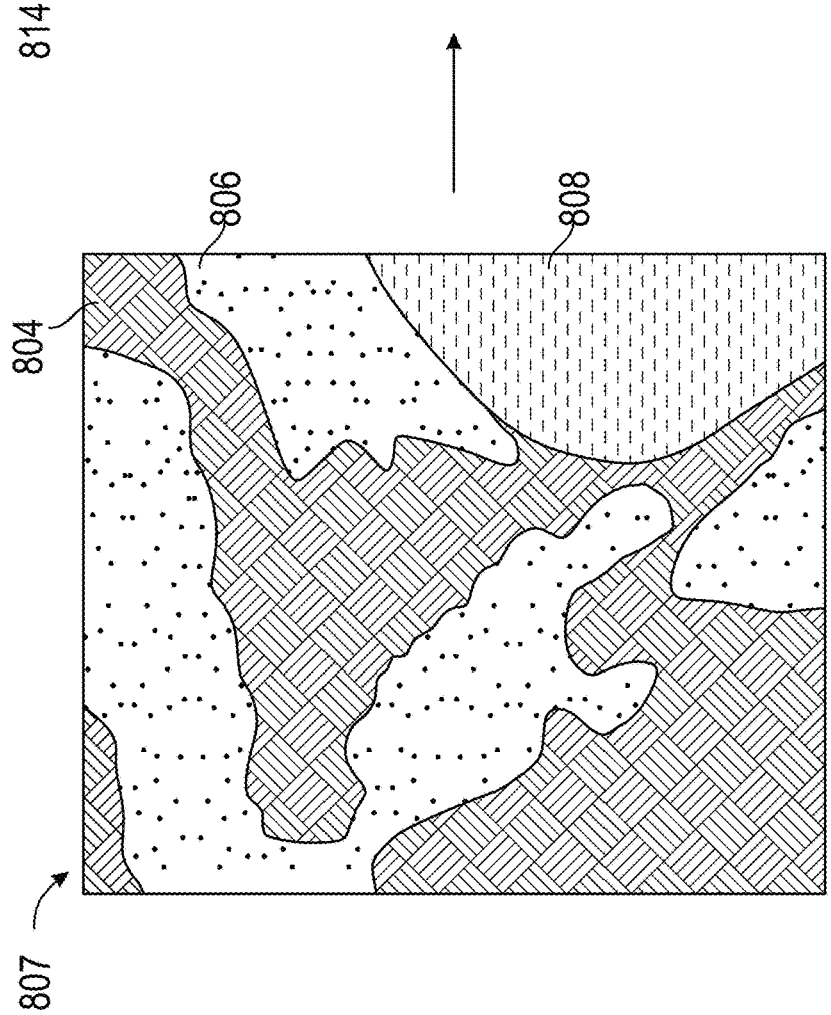
Figure 8E:
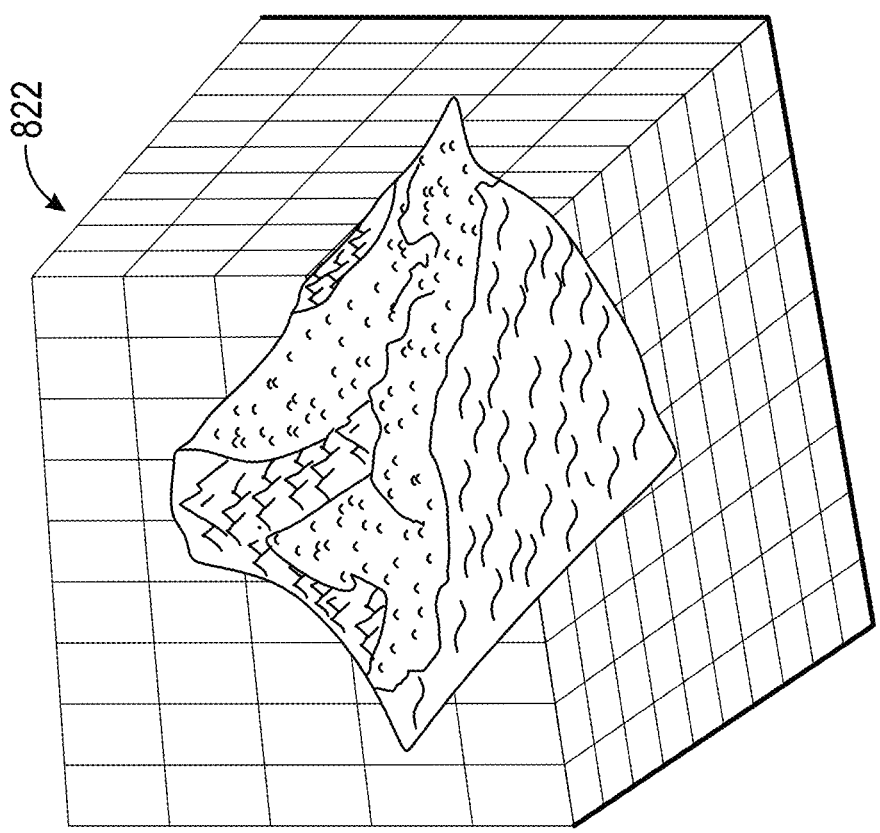
FIG. 8(e) illustrates an example three-dimensional semantic landscape that was generated based on a two-dimensional ground map and a modified two-dimensional height map.

Additionally, at block 414, after generating the semantic ground map 702, areas in the semantic ground map may be replaced with a corresponding texture (e.g., from among various textures stored in memory corresponding to each of the landscape types). For example, FIG. 8(c) illustrates a semantic ground map 807 (e.g., similar to semantic ground map 702 in FIG. 7(a)) whose segmented features 804-808 are represented with respective cross hatches (e.g., a non-realistic texture/mesh). Specifically, semantic ground map 807 includes a first area, second area, and third area that correspond to segmented features 804 (which is associated with properties of mountains), 806 (which is associated with properties of a hill/foliage area)), and 808 (which is associated with properties of a body of water, respectively.

FIG. 8(*d*) shows a resulting ground map 814 after areas of the semantic ground map 807 in FIG. 8(*c*) are replaced with a corresponding (e.g., realistic, user friendly) texture/mesh. The ground map 814 includes the same areas of semantic ground map 1207, but the areas in the ground map 814 have been replaced with realistic textures. In particular, the area in the ground map 814 that corresponds to the first area in the semantic ground map 807 has been updated with a texture 816 of mountains. Similarly, the areas in the ground map 814 that correspond to the second and third areas in the semantic ground map 807 have also been updated with a texture 818 of hills and a texture 820 of a body of water, respectively.

In some examples, the electronic device uses the ground map 814 (e.g., the ground map with realistic, user friendly textures) along with modified height map 802 (e.g., a height map that includes erosion information) to construct a three-dimensional landscape. For example, in FIG. 8(*e*), the electronic device may transform the ground map 814 into a three-dimensional landscape 822 by updating, pixel-by-pixel, and optionally scaling the semantic ground map 814 to include the height and erosion information defined by the modified height map 802. Thus, as illustrated in FIG. 8(*e*), the features/elements in the ground map 814 may be represented with realistic three-dimensional textures and with realistic erosion details.

At block 416, after constructing a three-dimensional landscape, simulated assets may be added to the three-dimensional landscape to create a more natural/realistic appearance of the three-dimensional landscape. In some examples, the assets being simulated/added to the three-dimensional landscape were not included in the landscape photos received at block 402 and/or were included in the landscape photos received at block 402 (but optionally having a different distribution than in the three-dimensional landscape).

In some examples, one or more segmented features of semantic ground map may be associated with one or more simulated assets. In some examples, simulated assets that may be added to the three-dimensional landscape include foliage assets (e.g., plants, trees, vegetation, flowers, etc.), animate assets (e.g., people, animals, insects, etc.), man-made/inanimate assets (e.g., cars, rocks, sidewalks, streetlamps, etc.), etc. In some examples, foliage simulated assets may be added to areas of a three-dimensional landscape that are associated with properties of hills, mountains, plains, etc., but may not be added to areas of the three-dimensional landscape that are associated with roads, sidewalks, buildings, etc. Similarly, simulated assets such as cars, sidewalks, streetlamps, etc. may be added to areas of a three-dimensional landscape that are associated with man-made landscapes (e.g., cityscape) including roads, intersections, etc., but are optionally not added to areas of the three-dimensional landscape that are associated with hills, mountains, plains, etc. In some examples, the types of simulated assets that are added to the three-dimensional landscape map may be user selected and/or may not be restricted to assets that would normally be located in that particular area of the three-dimensional landscape.

In some examples, statistic maps for the one or more simulated assets being added to the three-dimensional landscape are constructed. FIGS. 9(*a*)-9(*c*) illustrate statistic maps for two different types of simulated assets. Although FIGS. 9(*a*)-(*c*) show a process for generating statistic maps for two different types of trees assets in the three-dimensional landscape, it is understood that the process described below could be analogously applied to any type of simulated asset being added to the three-dimensional landscape.

FIG. 9(*a*) shows a statistical map 902 representing the density of tree type 901 in the three-dimensional landscape, a statistical map 904 representing the standard deviation of the age of tree type 901 in the three-dimensional landscape, and a statistical map 906 representing the average age of the tree type 901 in the three-dimensional landscape. FIG. 9(*a*) also shows a statistical map 908 representing the density of tree type 903 in the three-dimensional landscape, a statistical map 910 representing the standard deviation of the age of tree type 903 in the three-dimensional landscape, and a statistical map 912 representing the average age of the tree type 903 in the three-dimensional landscape. The statistical maps 902-912 in FIG. 9(*a*) are default statistical maps (e.g., optionally generated by the user of the electronic device or by the electronic device) that define a default distribution and ages of tree types 901 and 903 in the three-dimensional landscape. In some examples, the statistical maps 902-912 in FIG. 9(*a*) are default statistical maps because these statistical maps are not based on any particular ground map and/or height map (e.g., such as modified height map 802 and ground map 814). Each pixel in the statistic map optionally corresponds to an X and Y location in the three-dimensional landscape (e.g., an X and Y location in ground map 814 and an X and Y location in the modified height map 802) with the respective density, average age, and standard deviation of the age of tree types 901 and 903 being represented in grayscale values (e.g., with white optionally representing the maximum normalized value for a respective statistic map and black optionally representing the minimum normalized value for a respective statistic map).

In some examples, the default statistic maps 902-912 in FIG. 9(*a*) are modified based on semantic (e.g., location) characteristics of tree types 901 and 903. For example, if tree type 901 is generally found in nature occupying locations on landforms such as mountains, but not on landforms such as hills, plains, grasslands, etc., the electronic device may update the statistic maps 902-906 to mask or blur areas of the statistic maps 902-906 that correspond to hills, plains, grasslands, etc., in ground map 814 (e.g., to represent that the electronic device should not add tree type 901 to such locations in the three-dimensional landscape). Similarly, if tree type 903 is generally found in nature occupying locations on landforms such as hills, plains, grasslands, but not on landforms such as mountains, the electronic device may update the statistic map 908-912 to mask or blur areas of the statistic maps 908-912 that correspond to hills, plains, grasslands, etc., in ground map 814 (e.g., to represent that the electronic device should not add tree type 903 to such locations in the three-dimensional landscape). FIG. 9(*b*) illustrate statistic maps 902-912 after updating the statistic maps to account for the semantic preferences of tree types 901 and 903 in the three-dimensional landscape (e.g., after making or blurring areas where the display of tree types 901 and 903 in the three-dimensional landscape would not be realistic).

Figures 9A, 9B, 9C:
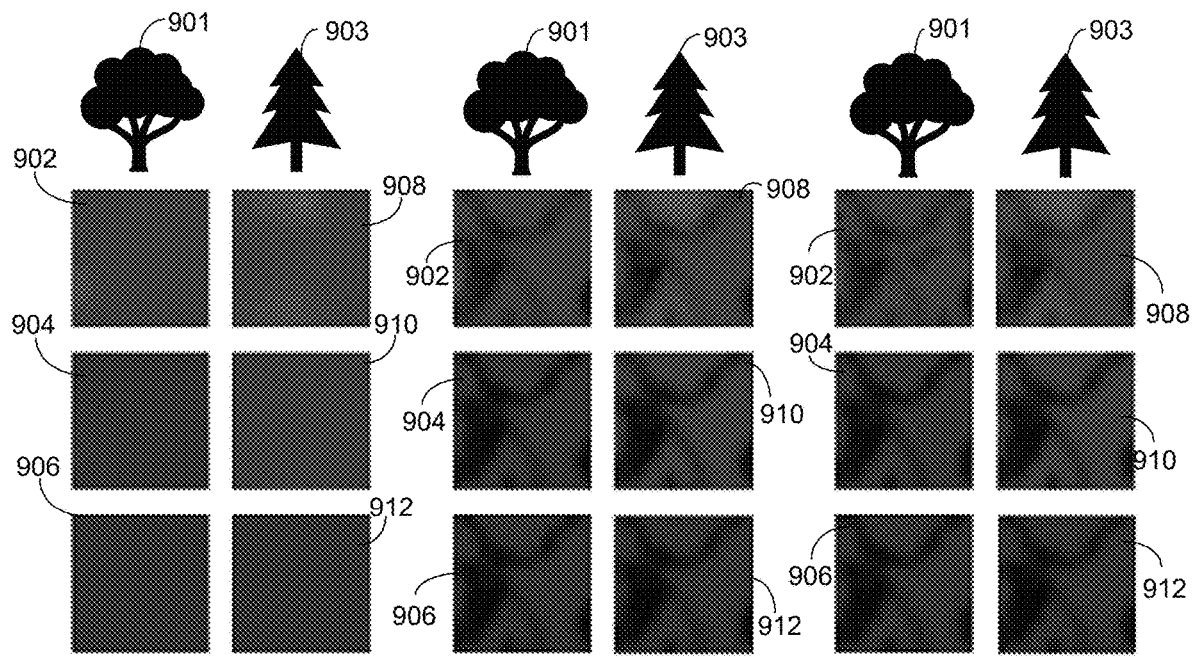
FIGS. 9(a)-9(c) illustrate statistic maps for two different types of simulated assets.

In some examples, the statistic maps 902-912 are further modified based on elevation/height characteristics of tree types 901 and 903. For example, if tree type 901 is generally found in nature occupying areas of high elevation (e.g., between 2,000-5,000 feet above sea level), but are not found in nature occupying areas of low elevation (e.g., under 1,000 feet above sea level), the electronic device may update the statistic maps 902-906 to mask or blur areas of the statistic maps 902-906 that correspond to low areas of elevations in the modified height map 802 (e.g., to represent that the electronic device should not add tree type 901 to areas of low elevation in the three-dimensional landscape). Similarly, if tree type 903 is generally found in nature occupying areas of low elevation (e.g., under 1,000 feet above sea level), but are not found in nature occupying areas of high elevation (e.g., between 2,000-5,000 feet above sea level), the electronic device may update the statistic maps 908-912 to mask or blur areas of the statistic maps 908-912 that correspond to high areas of elevations in the modified height map 802 (e.g., to represent that the electronic device should not add tree type 903 to areas of high elevation in the three-dimensional landscape). FIG. 9(c) illustrate statistic maps 902-912 after updating the statistic maps to account for the elevation preferences of tree types 901 and 903 in the three-dimensional landscape (e.g., after making or blurring areas where the display of tree types 901 and 903 at certain elevations in the three-dimensional landscape would not appear realistic).

Figure 10A:
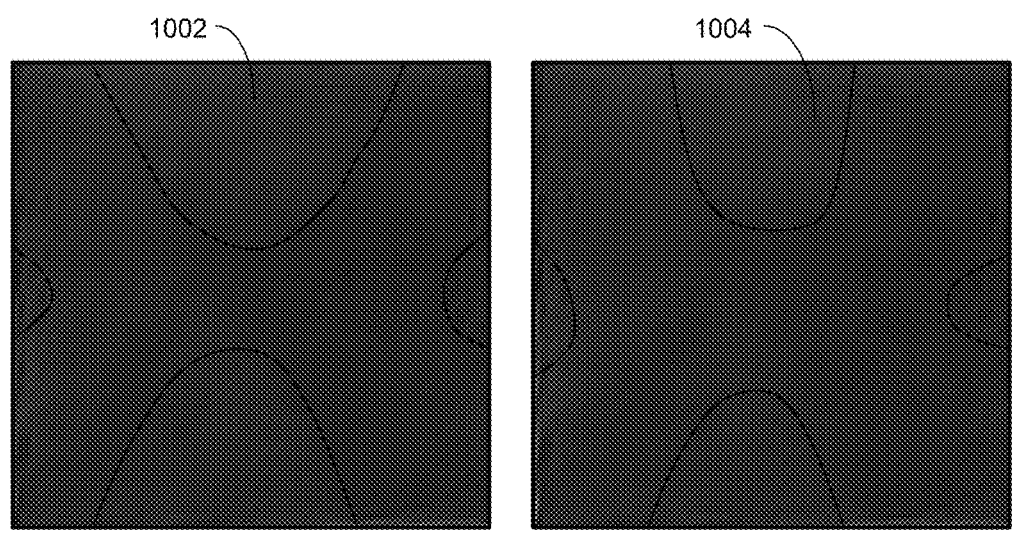
FIGS. 10(a)-10(d) illustrate sampling areas in one or more statistic maps and pruning simulated assets in those areas based on one or more conditions.
Figure 10B:
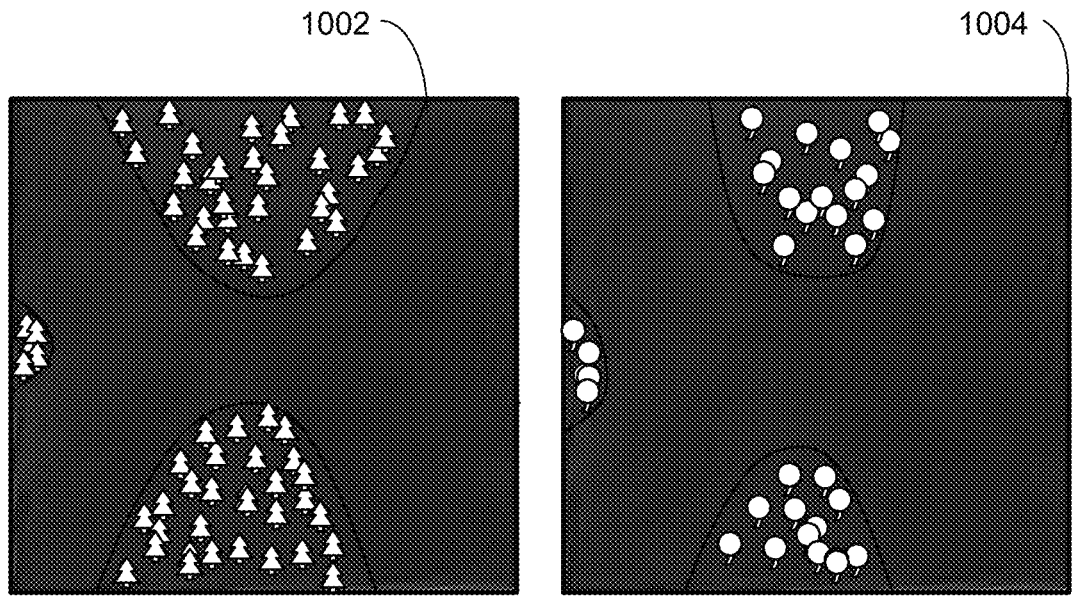
Figure 10C:
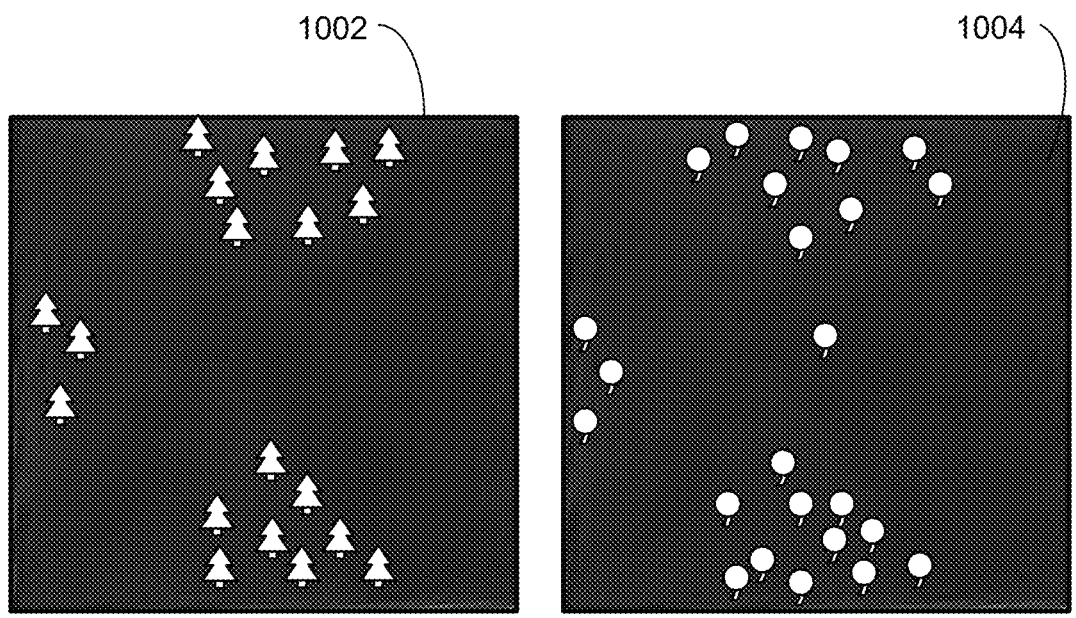

In some examples, after updating the statistic maps to incorporate semantic and/or elevation preferences, the electronic device can sample one or more areas of the statistic maps and subsequently add representations of tree types 901 and 903 to corresponding areas in the three-dimensional landscape. For example, in FIGS. 10(a) and 10(b), areas of the statistic maps 1002 and 1004 (similar to statistic maps 902 and 908, respectively) where there is a high density of tree types 901 and 903 are optionally sampled. FIG. 10(b) shows the resulting statistic map 1002 and 1004 after high density areas for tree types 901 and 903 were sampled from statistic map 1002 and 1004 in FIG. 10(a), respectively. In some examples, an area of a statistic map is considered to have a high density of a respective tree type if that area of the statistic map includes at least a threshold number of pixels above a particular grayscale value. In some examples, after sampling high density regions of the statistic map, trees included in those respective area can be pruned (e.g., clipped, filtered, etc.) based on environmental factors, light availability, atmosphere conditions, etc. FIG. 10(c) shows the resulting statistic map 1002 and 1004 after individual trees were pruned based on environmental factors, light availability, atmosphere conditions, etc. of the three-dimensional landscape.

Figure 10D:
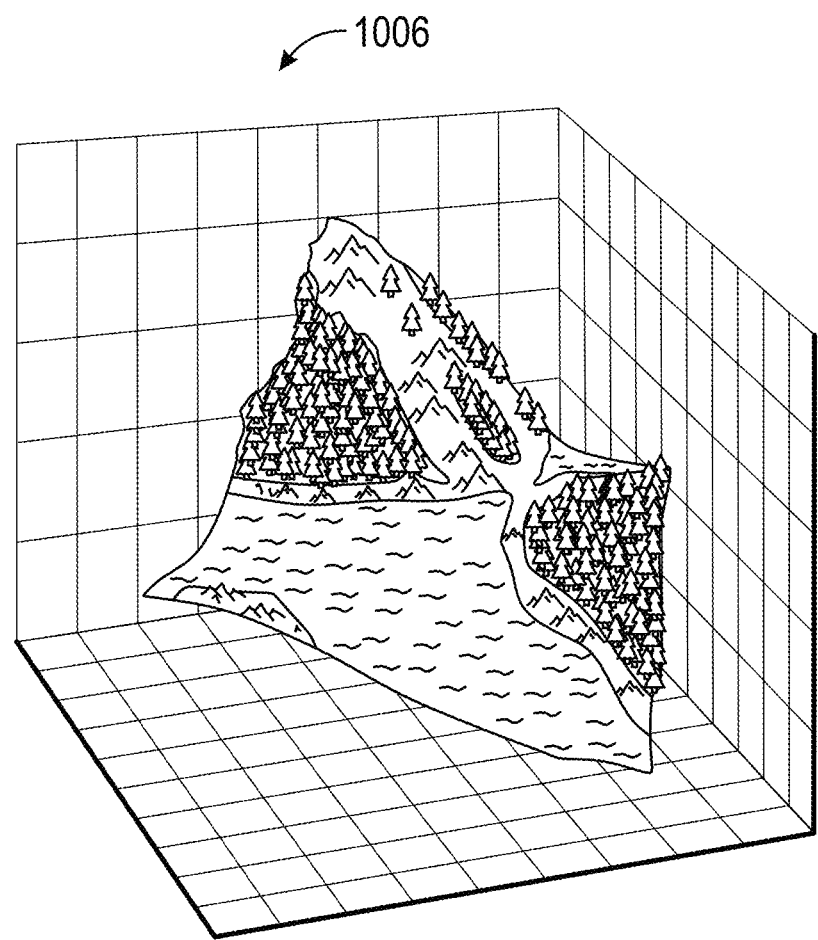

In some examples, the electronic device uses one or more statistic maps to add one or more types of simulated assets to the three-dimensional landscape. For example, in FIG. 10(d), the electronic device may add to the three-dimensional landscape 1006 (e.g., three-dimensional landscape 822) simulated assets for tree types 901 and 903 in accordance with the locations of the assets in statistic maps 1002 and 1004 in FIG. 10(c).

Figure 11:
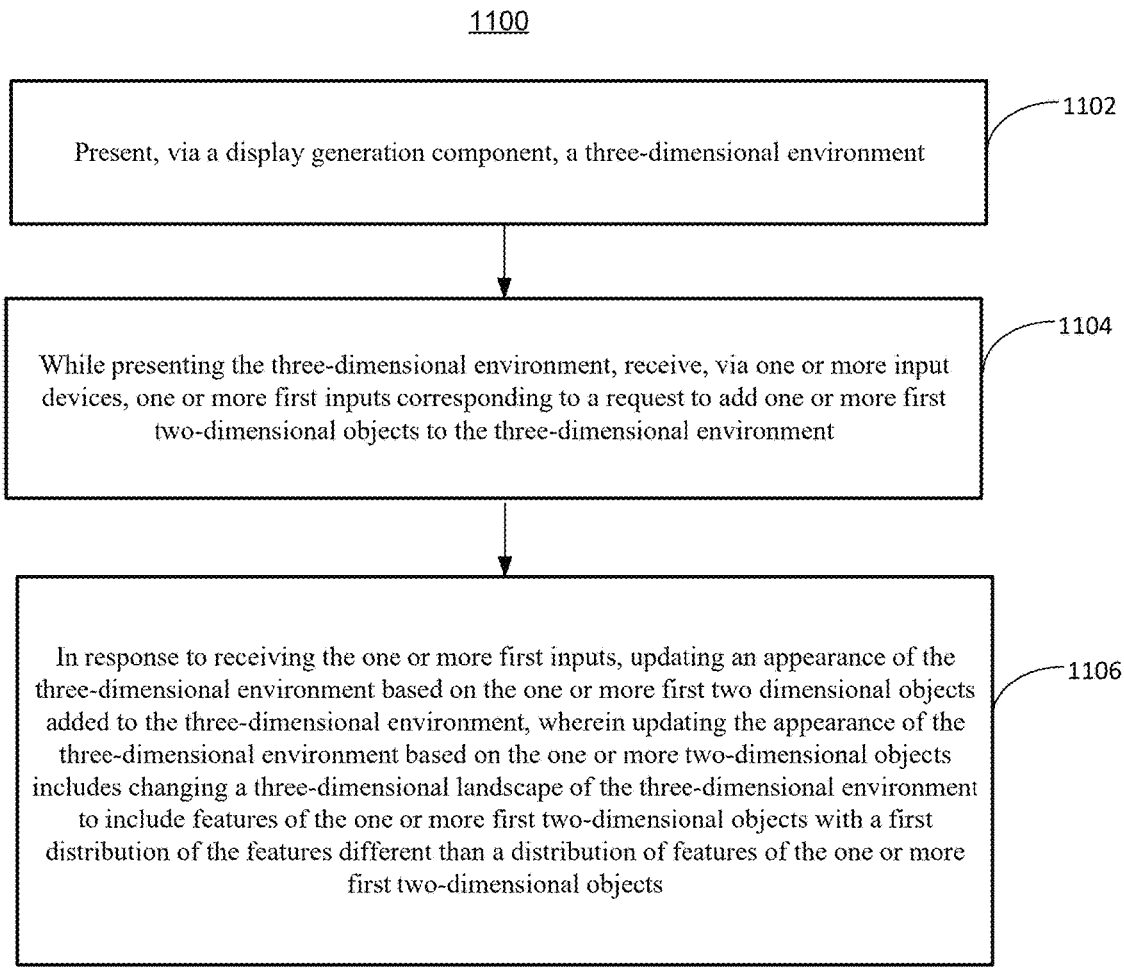
FIG. 11 illustrates a method 1100 for presenting a three-dimensional landscape in accordance with some examples of the disclosure.

FIG. 11 illustrates an example method 1100 (also referred to as a process) for presenting a three-dimensional landscape in accordance with some examples of the disclosure. Method 1100 is optionally performed at an electronic device such as device 100, device 200 or device 250. Some operations in method 1100 are optionally combined and/or optionally omitted. The order of some operations in method 1100 is optionally changed, in some examples.

In some examples, method 1100 is performed at an electronic device in communication with a display generation component and one or more input devices. In some examples, the electronic device presents (1102), via the display generation component, a three-dimensional environment. In some examples, while presenting the three-dimensional environment, the electronic device receives (1104), via the one or more input devices, one or more first inputs corresponding to a request to add one or more first two-dimensional objects to the three-dimensional environment. In some examples, in response to receiving the one or more first inputs, the electronic device updates (1106) an appearance of the three-dimensional environment based on the one or more first two dimensional objects added to the three-dimensional environment, wherein updating the appearance of the three-dimensional environment based on the one or more two-dimensional objects includes changing a three-dimensional landscape of the three-dimensional environment to include features of the one or more first two-dimensional objects with a first distribution of the features. In some embodiments, the first distribution of features is different than a distribution of features of the one or more first two-dimensional objects.

In some examples, a first area of the three-dimensional environment is configured to receive two-dimensional objects and the one or more first inputs corresponding to the request to add the one or more first two-dimensional objects to the three-dimensional environment comprises adding the one or more first two-dimensional objects to the first area of the three-dimensional environment.

In some examples, adding the one or more first two-dimensional objects to the first area of the three-dimensional environment comprises adding a first two-dimensional object at a first location within the first area and a second two-dimensional object at a second location within the first area, different from the first location; and the first distribution of the features includes an increased density of first features of the first two-dimensional object in a first portion of the three-dimensional landscape corresponding to the first location compared with a density of the first features outside the first portion of the three-dimensional landscape, and includes an increased density of second features of the second two-dimensional object in a second portion of the three-dimensional landscape corresponding to the second location compared with a density of the second features outside the second portion of the three-dimensional landscape.

In some examples, the electronic device receives, via the one or more input devices, a second input corresponding to a request to add one or more second two-dimensional objects to the first area in the three-dimensional environment. In some examples, in response to receiving the second request, the electronic device updates the three-dimensional landscape to include features of the one or more first two-dimensional objects and the one or more second two-dimensional objects in a second distribution of features different from the first distribution of features.

In some examples, the features of the one or more first two-dimensional objects are distributed differently after updating the three-dimensional landscape to include features of the one or more second two-dimensional objects.

In some examples, the one or more first two-dimensional objects correspond to a first set of features and the one or more second two-dimensional objects correspond to a second set of features, different from the first set of features. In some examples, the one or more first two-dimensional objects and the one or more second two-dimensional objects have at least one common feature.

In some examples, while displaying the three-dimensional landscape and while displaying the one or more first two-dimensional objects at one or more first locations in the first area of the three-dimensional environment and the one or more second two-dimensional objects at one or more second locations in the first area of the three-dimensional environment, the electronic device receives, via the one or more input devices, a third input corresponding to a request to move the one or more second two-dimensional objects from the one or more second locations to one or more third locations in the first area of the three-dimensional environment. In some examples, in response to receiving the third input, the electronic device updates, in the three-dimensional environment, the three-dimensional landscape to include a third distribution of the features, different than the second distribution.

In some examples, a respective distribution of the features defines where the features in the three-dimensional landscape are located. In some examples, a respective distribution of the features defines one or more visual attributes of the features in the three-dimensional landscape. In some examples, after updating the landscape to include features of the one or more first two-dimensional objects and of the one or more second two-dimensional objects, the electronic device receives, via the one or more input devices, a third input corresponding to a request to remove at least one of the one or more second two-dimensional objects from the first area in the three-dimensional environment. In some examples, in response to receiving the third input, the electronic device updates the three-dimensional landscape of the three-dimensional environment to include a fourth distribution of the features of the one or more first two-dimensional objects and the one or more second two-dimensional objects that are located in the first area in the three-dimensional environment.

In some examples, the one or more first two-dimensional objects and the one or more second two-dimensional objects include environmental features and non-environmental features.

In some examples, the first area of the three-dimensional environment includes a user interface element configured to receive the two-dimensional objects, and the one or more first inputs corresponding to the request to add the one or more first two-dimensional objects to the three-dimensional environment comprises adding the one or more first two-dimensional objects to the user interface element.

In some examples, while the three-dimensional environment is being presented via the display generation component, a viewpoint of a user of the electronic device corresponds to a first location in a physical environment of the electronic device. In some examples, the electronic device detects movement of the viewpoint of the user away from the first location to a second location in the physical environment of the electronic device. In some examples, in response to detecting the movement of the viewpoint of the user from the first location to the second location in the physical environment, the electronic device displays, via the display generation component, the three-dimensional environment from the viewpoint corresponding to the second location, including displaying the three-dimensional landscape in accordance with the viewpoint of the user at the second location.

In some examples, after adding the one or more first two-dimensional objects to the three-dimensional environment, the appearance of the three-dimensional environment is updated within a threshold amount of time after receiving the one or more first inputs.

It should be understood that the particular order of the description of the operations in FIG. 11 is merely exemplary and is not intended to indicate that the described order is the only order in which the operations could be performed. One of ordinary skill in the art would recognize various ways to reorder the operations described herein.

The operations of process described above are, optionally, implemented by an electronic device comprising: one or more processors; memory; and one or more programs stored in the memory. The one or more programs stored in the memory and configured to be executed by the one or more processors, cause the processor to perform any of the above operations. The operations of process described above are, optionally, implemented by a storing one or more programs. The one or more programs stored in the non-transitory computer readable storage medium and configured to be executed by the one or more processors of an electronic device, cause the processor to perform any of the above operations.

The operations of process described above are, optionally, implemented by running one or more functional modules in an information processing apparatus such as general-purpose processors (e.g., as described with respect to FIGS. 2A-2B) or application specific chips. Further, the operations described above with reference to FIG. 11 are, optionally, implemented by components depicted in FIGS. 2A-2B.

Figure 12:
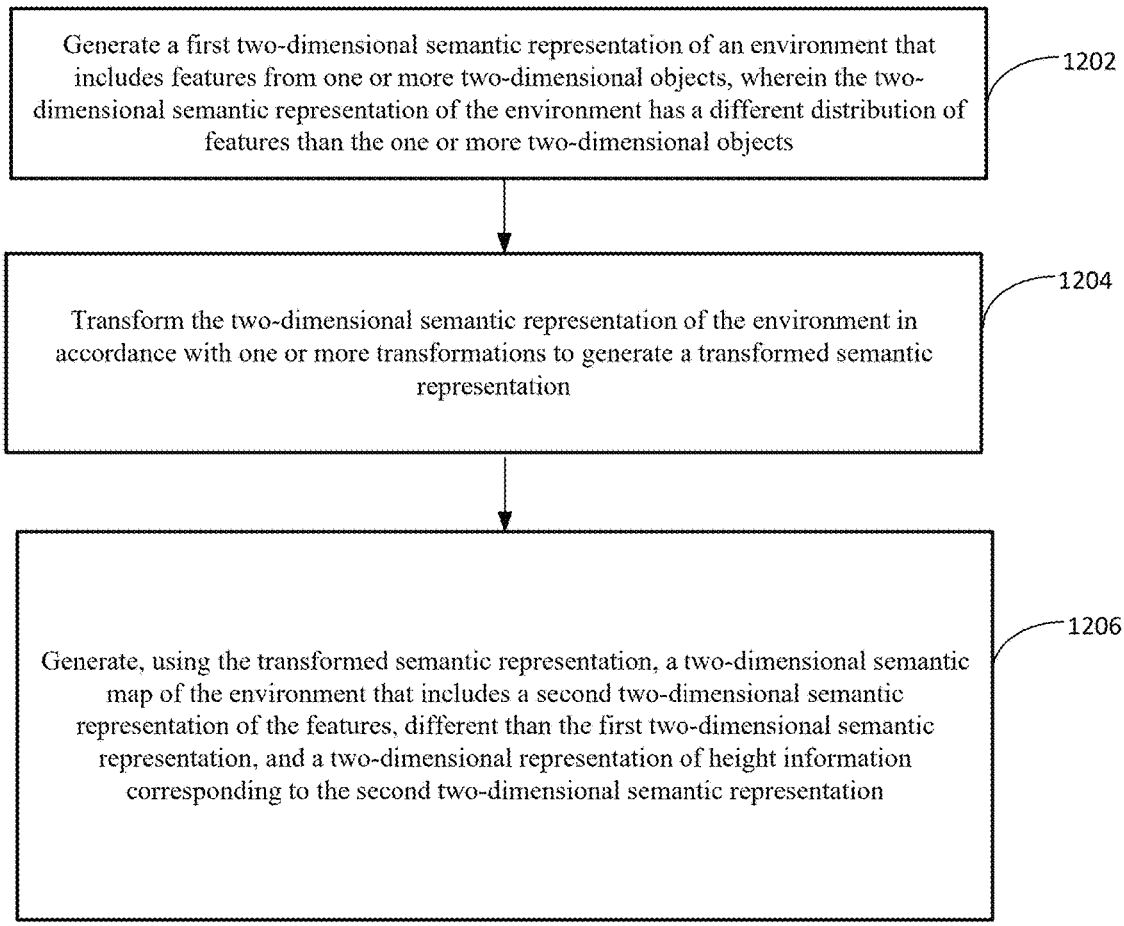
FIG. 12 illustrates another method 1200 for constructing a three-dimensional landscape in accordance with some examples of the disclosure.

FIG. 12 illustrates an example method 1200 (also referred to as a process) for constructing a three-dimensional landscape in accordance with some examples of the disclosure. Method 1200 is optionally performed at an electronic device such as device 100, device 200 or device 250. Some operations in method 1200 are optionally combined and/or optionally omitted. The order of some operations in method 1200 is optionally changed, in some examples.

In some examples, method 1200 is performed at an electronic device in communication with a display generation component and one or more input devices. In some examples, the electronic device generates (1202) a first two-dimensional semantic representation of an environment that includes features from one or more two-dimensional objects, wherein the two-dimensional semantic representation of the environment has a different distribution of features than the one or more two-dimensional objects. In some examples, the electronic device transforms (1204) the two-dimensional semantic representation of the environment in accordance with one or more transformations to generate a transformed semantic representation. In some examples, the electronic device generates (1206), using the transformed semantic representation, a two-dimensional semantic map of the environment that includes a second two-dimensional semantic representation of the features, different than the first two-dimensional semantic representation, and a two-dimensional representation of height information corresponding to the second two-dimensional semantic representation.

In some examples, the first two-dimensional semantic representation is greater in size than the one or more two-dimensional objects. In some examples, the first two-dimensional semantic representation includes a panoramic view of the environment which corresponds to a wider viewing angle of the environment than respective viewing angles of the one or more two-dimensional objects.

In some examples, the electronic device constructs a three-dimensional object based on the two-dimensional semantic map of the environment. In some examples, constructing the three-dimensional object based on the two-dimensional semantic map includes using the two-dimensional semantic map to generate a three-dimensional semantic representation of the environment that is segmented into one or more semantic regions, and substituting the one or more semantic regions with one or more corresponding textures.

In some examples, the electronic device segments the one or more two-dimensional objects into one or more segmented images, using an image segmentation model, that corresponds to the features of the one or more two-dimensional objects.

In some embodiment, generating the first two-dimensional semantic representation of the environment, comprises: generating a partial semantic representation of the environment including the one or more segmented images; and constructing remaining portions of the environment not included in the partial semantic representation of the environment using the one or more segmented images. In some examples, the partial semantic representation is a partial panoramic view of the environment.

In some examples, the one or more transformations include a first transformation that removes at least one feature included in the one or more two-dimensional objects from inclusion in the transformed semantic representation. In some examples, the one or more transformations include a non-linear transformation that transforms the two-dimensional semantic representation from a cartesian coordinate system to a polar coordinate system. IN some examples, generating the two-dimensional semantic map of the environment includes using a machine learning model that is configured to receive the transformed semantic representation as input and generate, as output, the two-dimensional semantic map that corresponds to the transformed semantic representation. In some examples, the machine learning model is a generative adversarial network (GAN).

In some examples, the electronic device generates, using the two-dimensional representation of height information, a second two-dimensional representation of height information corresponding to the second two-dimensional representation, wherein the second two-dimensional representation of height information includes erosion information for the two-dimensional semantic map.

In some examples, generating the second two-dimensional representation of height information includes using a machine learning model that is configured to receive the two-dimensional representation of height information and generate, as output, the second two-dimensional representation of height information.

In some examples, the electronic device constructs a three-dimensional object based on the two-dimensional semantic map of the environment and the two-dimensional representation of erosion information. In some examples, the electronic device adds one or more assets to the constructed three-dimensional object based on the features included in the second two-dimensional semantic representation. In some examples, adding the one or more assets to the constructed three-dimensional object includes: determining a statistical distribution for the one or more assets being added to the three-dimensional object using semantic and elevation preferences of the one or more assets; and adding to the three-dimensional object the one or more assets in accordance with the determined statistical distribution.

It should be understood that the particular order of the description of the operations in FIG. 12 is merely exemplary and is not intended to indicate that the described order is the only order in which the operations could be performed. One of ordinary skill in the art would recognize various ways to reorder the operations described herein.

The operations of process described above are, optionally, implemented by an electronic device comprising: one or more processors; memory; and one or more programs stored in the memory. The one or more programs stored in the memory and configured to be executed by the one or more processors, cause the processor to perform any of the above operations. The operations of process described above are, optionally, implemented by a storing one or more programs. The one or more programs stored in the non-transitory computer readable storage medium and configured to be executed by the one or more processors of an electronic device, cause the processor to perform any of the above operations.

The operations of process described above are, optionally, implemented by running one or more functional modules in an information processing apparatus such as general-purpose processors (e.g., as described with respect to FIGS. 2A-2B) or application specific chips. Further, the operations described above with reference to FIG. 12 are, optionally, implemented by components depicted in FIGS. 2A-2B.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

The invention claimed is:

1. A method comprising:
at an electronic device in communication with a display and one or more input devices:
presenting, via the display, a three-dimensional environment including a three-dimensional landscape;
while presenting the three-dimensional environment, receiving, via the one or more input devices, one or more first inputs corresponding to a request to add first two-dimensional objects, including a first two-dimensional object and a second two-dimensional object, to the three-dimensional environment; and
in response to receiving the one or more first inputs, updating an appearance of the three-dimensional environment based on the first two dimensional objects added to the three-dimensional environment, wherein updating the appearance of the three-dimensional environment based on the first two-dimensional objects includes changing a three-dimensional landscape of the three-dimensional environment to include features of the first two-dimensional objects with a first distribution of features including first features from the first two-dimensional object and second features from the second two-dimensional object.

2. The method of claim 1, wherein the first distribution of features is different than a distribution of features of the first two-dimensional objects.

3. The method of claim 1, wherein a user interface element at a first area of the three-dimensional environment is configured to receive two-dimensional objects and the one or more first inputs corresponding to the request to add the first two-dimensional objects to the three-dimensional environment comprise adding the first two-dimensional objects including the first two-dimensional object and the second two-dimensional object to the user interface element at a first area of the three-dimensional environment.

4. The method of claim 3, wherein:
adding the first two-dimensional objects including the first two-dimensional object and the second two-dimensional object to the first area of the three-dimensional environment comprises adding the first two-dimensional object at a first location within the first area and the second two-dimensional object at a second location within the first area, different from the first location; and the first distribution of features includes an increased density of first features of the first two-dimensional object in a first portion of the three-dimensional landscape corresponding to the first location compared with a density of the first features outside the first portion of the three-dimensional landscape, and includes an increased density of second features of the second two-dimensional object in a second portion of the three-dimensional landscape corresponding to the second location compared with a density of the second features outside the second portion of the three-dimensional landscape.

5. The method of claim 3, further comprising:
receiving, via the one or more input devices, a second input corresponding to a request to add one or more second two-dimensional objects to the first area in the three-dimensional environment,
in response to receiving the second input, updating the three-dimensional landscape to include features of the first two-dimensional objects and the one or more second two-dimensional objects in a second distribution of features different from the first distribution of features.

6. The method of claim 5, wherein the features of the first two-dimensional objects are distributed differently after updating the three-dimensional landscape to include features of the one or more second two-dimensional objects.

7. The method of claim 1, wherein after adding the first two-dimensional objects to the three-dimensional environment, the appearance of the three-dimensional environment is updated within a threshold amount of time after receiving the one or more first inputs.

8. An electronic device, comprising:
a display;
one or more input devices;
one or more processors;
memory; and
one or more programs, wherein the one or more programs are stored in memory and configured to be executed by the one or more processors, the one or more programs including instructions for:
presenting, via the display, a three-dimensional environment;
while presenting the three-dimensional environment, receiving, via the one or more input devices, one or more first inputs corresponding to a request to add first two-dimensional objects, including a first two-dimensional object and a second two-dimensional object, to the three-dimensional environment; and
in response to receiving the one or more first inputs, updating an appearance of the three-dimensional environment based on the first two dimensional objects added to the three-dimensional environment, wherein updating the appearance of the three-dimensional environment based on the first two-dimensional objects includes changing a three-dimensional landscape of the three-dimensional environment to include features of the first two-dimensional objects with a first distribution of features including first features from the first two-dimensional object and second features from the second two-dimensional object.

9. The electronic device of claim 8, wherein the first distribution of features is different than a distribution of features of the first two-dimensional objects.

10. The electronic device of claim 8, wherein a first area of the three-dimensional environment is configured to receive two-dimensional objects and the one or more first inputs corresponding to the request to add the first two-dimensional objects to the three-dimensional environment comprises adding the first two-dimensional objects including the first two-dimensional object and the second two-dimensional object to the first area of the three-dimensional environment.

11. The electronic device of claim 10, wherein:
adding the first two-dimensional objects including the first two-dimensional object and the second two-dimensional object to the first area of the three-dimensional environment comprises adding the first two-dimensional object at a first location within the first area and the second two-dimensional object at a second location within the first area, different from the first location; and the first distribution of features includes an increased density of first features of the first two-dimensional object in a first portion of the three-dimensional landscape corresponding to the first location compared with a density of the first features outside the first portion of the three-dimensional landscape, and includes an increased density of second features of the second two-dimensional object in a second portion of the three-dimensional landscape corresponding to the second location compared with a density of the second features outside the second portion of the three-dimensional landscape.

12. The electronic device of claim 10, the one or more programs further including instructions for:
receiving, via the one or more input devices, a second input corresponding to a request to add one or more second two-dimensional objects to the first area in the three-dimensional environment,
in response to receiving the second input, updating the three-dimensional landscape to include features of the first two-dimensional objects and the one or more second two-dimensional objects in a second distribution of features different from the first distribution of features.

13. The electronic device of claim 12, wherein the features of the first two-dimensional objects are distributed differently after updating the three-dimensional landscape to include features of the one or more second two-dimensional objects.

14. The electronic device of claim 12, the one or more programs further including instructions for:
while displaying the three-dimensional landscape and while displaying the first two-dimensional objects at one or more first locations in the first area of the three-dimensional environment and the one or more second two-dimensional objects at one or more second locations in the first area of the three-dimensional environment, receiving, via the one or more input devices, a third input corresponding to a request to move the one or more second two-dimensional objects from the one or more second locations to one or more third locations in the first area of the three-dimensional environment; and
in response to receiving the third input, updating, in the three-dimensional environment, the three-dimensional landscape to include a third distribution of features, different than the second distribution of features.

15. The electronic device of claim 12, the one or more programs further including instructions for:
   after updating the three-dimensional landscape to include features of the first two-dimensional objects and of the one or more second two-dimensional objects, receiving, via the one or more input devices, a third input corresponding to a request to remove a first set of two-dimensional objects from the first area in the three-dimensional environment; and
   in response to receiving the third input, updating the three-dimensional landscape of the three-dimensional environment to include a fourth distribution of the features, wherein the fourth distribution is based on the features of the first two-dimensional objects and the one or more second two-dimensional objects that remain in the first area of the three-dimensional environment after removing the first set of two-dimensional objects.

16. The electronic device of claim 10, wherein the first area of the three-dimensional environment includes a user interface element configured to receive the two-dimensional objects, and the one or more first inputs corresponding to the request to add the first two-dimensional objects to the three-dimensional environment comprises adding the first two-dimensional objects to the user interface element.

17. A non-transitory computer readable storage medium storing one or more programs, the one or more programs comprising instructions, which when executed by one or more processors of an electronic device in communication with a display and one or more input devices, cause the electronic device to:
   present, via the display, a three-dimensional environment;
   while presenting the three-dimensional environment, receive, via the one or more input devices, one or more first inputs corresponding to a request to add first two-dimensional objects, including a first two-dimensional object and a second two-dimensional object, to the three-dimensional environment; and
   in response to receiving the one or more first inputs, update an appearance of the three-dimensional environment based on the first two dimensional objects added to the three-dimensional environment, wherein updating the appearance of the three-dimensional environment based on the first two-dimensional objects includes changing a three-dimensional landscape of the three-dimensional environment to include features of the first two-dimensional objects with a first distribution of features including first features from the first two-dimensional object and second features from the second two-dimensional object.

18. The non-transitory computer readable storage medium of claim 17, wherein:
   adding the first two-dimensional objects to a user interface element of the three-dimensional environment comprises adding the first two-dimensional object at a first location within the user interface element and the second two-dimensional object at a second location within the user interface element, different from the first location; and
   the first distribution of features includes an increased density of first features of the first two-dimensional object in a first portion of the three-dimensional landscape corresponding to the first location compared with a density of the first features outside the first portion of the three-dimensional landscape, and includes an increased density of second features of the second two-dimensional object in a second portion of the three-dimensional landscape corresponding to the second location compared with a density of the second features outside the second portion of the three-dimensional landscape.

19. The non-transitory computer readable storage medium of claim 17, the instructions, when executed by the one or more processors of the electronic device, further cause the electronic device to:
   receive, via the one or more input devices, a second input corresponding to a request to add one or more second two-dimensional objects to a user interface element in the three-dimensional environment,
   in response to receiving the second input, update the three-dimensional landscape to include features of the first two-dimensional objects and the one or more second two-dimensional objects in a second distribution of features different from the first distribution of features.

20. The non-transitory computer readable storage medium of claim 19, the instructions, when executed by the one or more processors of the electronic device, further cause the electronic device to:
   while displaying the three-dimensional landscape and while displaying the first two-dimensional objects at one or more first locations in the user interface element and the one or more second two-dimensional objects at one or more second locations in the user interface element, receive, via the one or more input devices, a third input corresponding to a request to move the one or more second two-dimensional objects from the one or more second locations to one or more third locations in the user interface element; and
   in response to receiving the third input, update, in the three-dimensional environment, the three-dimensional landscape to include a third distribution of features, different than the second distribution of features.

* * * * *